(12) United States Patent
Kimura et al.

(10) Patent No.: US 7,768,898 B2
(45) Date of Patent: Aug. 3, 2010

(54) MULTI-LAYER INFORMATION STORAGE MEDIUM AND INFORMATION APPARATUS

(75) Inventors: Shinichi Kimura, Osaka (JP); Hiroshi Ueda, Nara (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 11/420,833

(22) Filed: May 30, 2006

(65) Prior Publication Data

US 2006/0268670 A1   Nov. 30, 2006

(30) Foreign Application Priority Data

May 30, 2005   (JP)   ............................. 2005-156790

(51) Int. Cl.
*G11B 7/24* (2006.01)

(52) U.S. Cl. .................................. 369/275.3

(58) Field of Classification Search .................. None
See application file for complete search history.

(56) References Cited

U.S. PATENT DOCUMENTS

| | | | |
|---|---|---|---|
| 7,203,153 B2 | 4/2007 | Kuraoka et al. | 369/275.3 |
| 7,385,889 B2 * | 6/2008 | Lee et al. | 369/47.14 |
| 7,489,620 B2 * | 2/2009 | Okada et al. | 369/275.3 |
| 2003/0103431 A1 * | 6/2003 | Kuroda | 369/59.25 |
| 2005/0002308 A1 | 1/2005 | Tanaka | 369/94 |
| 2005/0013225 A1 * | 1/2005 | Ogasawara | 369/53.22 |
| 2006/0146666 A1 | 7/2006 | Ueda et al. | 369/47.1 |

FOREIGN PATENT DOCUMENTS

| | | |
|---|---|---|
| JP | 10-144006 | 5/1998 |
| JP | 2003-022618 A | 1/2003 |
| JP | 2003-168221 A | 6/2003 |
| JP | 2003-288759 | 10/2003 |
| JP | 2004-206849 | 7/2004 |
| JP | 2004-280864 A | 10/2004 |
| JP | 2004-288293 | 10/2004 |
| JP | 2004-342181 | 12/2004 |
| JP | 2005-116176 A | 4/2005 |
| WO | 03/063143 A1 | 7/2003 |
| WO | 03/063144 A1 | 7/2003 |

(Continued)

OTHER PUBLICATIONS

Notice of Reasons for Rejection, Japanese Patent Application No. 2006-148003, dated Dec. 8, 2009 with English translation.

(Continued)

*Primary Examiner*—Joseph H Feild
*Assistant Examiner*—Tawfik Goma
(74) *Attorney, Agent, or Firm*—Renner, Otto, Boisselle & Sklar, LLP

(57) ABSTRACT

A multi-layer information storage medium 600 includes: a data-reading surface; and eight recording layers 601 to 608 for recording data which is read out by using a blue-violet light beam. Each of the recording layers 601 to 608 has a user data area 610. A recording layer which is the most distant from the data-reading surface 601 includes a disk information area 26 and a defect management area 27 for recording management information concerning all of the recording layers 601 to 608.

10 Claims, 21 Drawing Sheets

FOREIGN PATENT DOCUMENTS

WO     2004/079739 A1     9/2004

OTHER PUBLICATIONS

Notice of Reasons for Rejection, Japanese Patent Application No. 2006-148003, mailed Feb. 16, 2010 with English translation.

Decision of Rejection for corresponding Japanese Application No. 2006-148003 dated Mar. 30, 2010 and English translation.

Dismissal of Amendments for corresponding Japanese Application No. 2006-148003 dated Mar. 30, 2010 and English translation.

* cited by examiner

MULTI-LAYER INFORMATION STORAGE MEDIUM AND INFORMATION APPARATUS

BACKGROUND OF THE INVENTION

1. Field of the Invention

The present invention relates to a multi-layer information storage medium and an information apparatus.

2. Description of the Related Art

Known optical disks are information storage media having a sector structure. Optical disks can be generally classified into three types, depending on their characteristics. A first type is a read-only disk, which carries data that has been recorded in the form of bumps and dents on the disk, such that the user cannot record any new data. A second type is a write-once disk, which includes a recording film composed of an organic dye or the like, such that a recording is possible only once in each sector. A third type is a rewritable disk, which includes a recording film composed of a phase-change material or the like, such that a recording (rewriting) is possible a plurality of times.

In recent years, audio/video data (hereinafter referred to as "AV data") of audio, video, etc., is broadcast or distributed in digital form, thus leading to a need for optical disks having higher densities and larger capacities. In order to obtain an increased storage capacity, it is effective to employ a plurality of recording layers. For example, in the case of a DVD read-only disk, two recording layers are formed in each optical disk, whereby its capacity is increased about twofold.

The increase in the capacities of optical disks has also made them available for video recording, e.g., DVDs. On the one hand, data for computer data recording (hereinafter referred to as "PC data") does not tolerate even small errors, and therefore requires highly reliable recording. Examples of PC data include data files, file management information, and program management information. On the other hand, AV data for video recording and/or audio recording needs to be recorded in real time as the data comes in continuously. The reproduced video and/or audio may contain some disturbances so long as they are tolerable to the human senses, and therefore AV data does not require as much data reliability as does a computer data recording file. However, it is important that recording of AV data can proceed without interruptions. Thus, different abilities are expected of a storage device for PC data recording and a storage device for AV data recording: the former requires a high reliability even if it may be more time-consuming, whereas the latter requires an ability to achieve continuous recording.

Referring to FIG. 1, the principle of data reproduction from an optical disk having two recording layers will be described. The illustrated optical disk includes a pair of transparent substrates having spiral track grooves formed thereon, the transparent substrates supporting two recording layers. The transparent substrates are attached together, via a transparent photocuring resin which is filled in the interspace between the two recording layers, thus constituting one optical disk.

For convenience, the recording layer which is located at a longer distance from the data-reading surface of the optical disk will be referred to as the "first recording layer", whereas the recording layer with a shorter distance therefrom will be referred to as the "second recording layer". The thickness and composition of the second recording layer are adjusted so that the second recording layer is partly reflective and partly transmissive with respect to incident light. The thickness and composition of the first recording layer are adjusted so that the first recording layer reflects all of the incident light. By bringing an objective lens (for converging laser light) so as to be close to or away from the optical disk, a beam spot (focal point) of laser light can be selectively converged on the first or second recording layer.

FIG. 2 shows an area-layout of a recording layer 21 of a conventional rewritable optical disk. In the recording layer 21 shown in FIG. 2, a lead-in area 22 includes a disk information area 26 and a defect management area 27 (hereinafter abbreviated as "DMA") formed therein. A lead-out area 25 also includes a defect management area 27 formed therein. Spare areas 23 are provided between the lead-in area 22 and a user data area 24, and between the user data area 24 and the lead-out area 25.

The disk information area 26 stores parameters which are necessary for performing data recording/reproduction for the optical disk, and information concerning physical properties of the optical disk.

The defect management areas 27 and the spare areas 23 are areas which are provided for realizing defect management. Under defect management, any sector in the user data area 24 for which proper recording/reproduction cannot be performed (thus called a "defective sector") is replaced by another sector which is in good condition.

Each spare area 23 is an area containing sectors with which defective sectors are to be replaced (such sectors will be generally referred to as "spare sectors", and any spare sector which has actually replaced a defective sector will be referred to as a "replacement sector"). In a DVD-RAM, spare areas 23 are provided at two positions, i.e., the inner periphery side and outer periphery side of the user data area 24, and the size of the spare area 23 that is provided at the outer periphery side is increasable so as to accommodate an unexpected increase in the defective sectors.

Each defect management area 27 includes: a disk definition structure (DDS) 28 for retaining a format concerning defect management, including management of the size and locations of the spare areas 23; and a defect list (DL) 29 which is a listing of positions of defective sectors and positions of replacement sectors corresponding thereto. In many optical disks, for robustness concerns, the same content is recorded in duplicate in each of the defect management areas 27 at the inner periphery side and the outer periphery side, thus resulting in quadruplet recording of the aforementioned elements (see, for example, Japanese Laid-Open Patent Publication No. 2003-288759).

On the other hand, in a write-once medium, any piece of information that has once been written cannot be erased. Due to such characteristics, instead of overwriting any previously-recorded information, new information is always appended in a new position ("additional write"). Therefore, a write-once medium contains management information which is different from that of a rewritable-type medium.

FIG. 3 shows an area-layout of a recording layer 301 of a DVD-R as a conventional write-once optical disk. The recording layer 301 shown in FIG. 3 includes, from the inner periphery side toward the outer periphery side, an R-information area 302 (hereinafter abbreviated as "R-Info"), a lead-in area 303, a user data area 304, and a lead-out area 305.

The lead-in area 303 includes a disk information area 320 formed therein.

The R-Info 302 is an area which is unique to write-once disks. The R-Info 302 includes a recording management area 310 (hereinafter abbreviated as "RMA").

The RMA 310 is composed of recording management data 311 (hereinafter abbreviated as "RMD"), each of which represents a recording status of the disk. By acquiring the latest RMD 311, it becomes possible to acquire addresses at which additional writes can be performed, etc.

In the case of a DVD+RW, the aforementioned information can be obtained by referring to the FDCB (Format Disc Control Block) information. In the case of a DVD+R, the aforementioned information can be obtained by referring to the SDCB (Session Disc Control Block) information.

FIG. 4 shows an area-layout of a recording layer 401 of a conventional write-once optical disk which contains defect management information. The recording layer 401 shown in FIG. 4 includes, from the inner periphery side toward the outer periphery side, a lead-in area 402, a spare area 403, a user data area 404, another spare area 403, and a lead-out area 405.

The lead-in area 402 includes a disk information area 420, a defect management area 430, and a temporary disk management area 440 (hereinafter abbreviated as "TDMA") formed therein. The lead-out area 405 includes a defect management area 430. The spare areas 403 are located between the lead-in area 402 and the user data area 404, and between the user data area 404 and the lead-out area 405.

In the case of a write-once optical disk, recording to DMA can only be made once, too. Therefore, by using any method similar to that for a rewritable optical disk, it is impossible to ensure that the latest defect management information is always recorded in a DMA which is at a predetermined position. This is the reason why the TDMA is provided, which realizes compatibility with a rewritable-type optical disk.

The TDMA 440 is composed of N temporary disk management structures 441 (hereinafter abbreviated as "TDMS"), where N is a positive number equal to or greater than one. The TDMS 441 is an area for temporarily recording defect management information that have been updated before the write-once optical disk receives a finalization (i.e., conversion of a write-once optical disk to a data structure which is compatible with rewritable optical disks, which involves recording the content of the latest TDMS 441 in DMA form). The TDMS 441 is composed of: a temporary defect list (hereinafter abbreviated as "TDL") 442, which is a listing of positions of defective sectors and positions of replacement sectors corresponding thereto; and a temporary disk definition structure (hereinafter abbreviated as "TDDS") 443, which includes temporary defect list beginning position information (i.e., information of a beginning position of the temporary defect list 442) and the like.

In the disk information area (26 in FIG. 2; 320 in FIG. 3; 420 in FIG. 4), information is recorded in the form of pits (bumps and dents). Alternatively, before disk shipment, for example, a method which is similar to the method of performing a recording to the data area is carried out to make pre-recordings in the disk information area.

The defect management information (DDS and DL, or TDL and TDDS) and the recording management data (RMD, FDCB, or SDCB) are to be recorded by an optical disk drive or the like after disk shipment.

Japanese Laid-Open Patent Publication No. 2004-206849 discloses a multi-layer information storage medium comprising a plurality of recording layers, and teaches to provide management information in a specific recording layer.

A write-once or rewritable multi-layer optical disk having a plurality of recording layers has a problem in that a recording layer at a shorter distance from the data-reading surface has a lower reliability when scratches, fingerprints and/or dust exist on the disk surface, possibly making data reproduction from the optical disk impossible. This is because, as shown in FIG. 5, the scratches, fingerprints and/or dust on the disk surface greatly affect the reproduction light.

For example, there is a problem in that, if the defect management information (DDS and DL, or TDL and TDDS) or a replacement sector cannot be reproduced, it is impossible to reproduce the user data which is recorded on the information storage medium.

The recording management data (e.g., RMD, FDCB, SDCB) is important management information which indicates the recording status of the optical disk, as described above. Therefore, if the recording management data cannot be reproduced, it becomes impossible to perform any additional writes to the optical disk, so that the advantage of the disk's large capacity is lost. The loss is increased as the storage capacity of the disk becomes larger.

If the file management information cannot be reproduced, it becomes impossible to access file data itself, so that the file data is no longer useable. There is also a problem in that a data file (e.g., a data file produced by a word processor) may become entirely unreadable even when only a portion thereof cannot be read.

Japanese Laid-Open Patent Publication No. 2004-206849, supra, discloses providing a management information area in a specific recording layer, but teaches that a recording layer which is in a position where there is minimum unfavorable influence from the tilt of an optical disk should be selected as such a specific recording layer. The unfavorable influence from the tilt of an optical disk is known to increase at deeper depths from the data-reading surface. Therefore, based on the teachings of the aforementioned publication, one would conclude that it is preferable to provide any management information area in a recording layer that is the closest to the data-reading surface. However, as described above, there is a problem in that the influence of the scratches, fingerprints, etc., on the disk surface would increase as the distance from the data-reading surface to the recording layer becomes shorter.

SUMMARY OF THE INVENTION

The present invention has been made in view of the aforementioned problems, and an objective thereof is to provide a highly reliable multi-layer information storage medium and a highly reliable information apparatus.

A multi-layer information storage medium according to the present invention is a multi-layer information storage medium comprising: a data-reading surface; and three or more recording layers for recording data which is read out by using a light beam of a same wavelength, wherein, each recording layer has a user data area; and among the three or more recording layers, a recording layer which is the most distant from the data-reading surface includes a management information area for recording management information concerning all of the recording layers.

In a preferred embodiment, a recording layer which is the closest to the data-reading surface among the three or more recording layers does not include a management information area for recording management information concerning all of the recording layers.

In a preferred embodiment, the management information area includes a disk information area in which a parameter concerning access to the recording layer and information concerning a physical property related to the recording layer are stored.

In a preferred embodiment, the management information area includes a defect management area for keeping defective positions in the user data areas under management; and the defect management area contains a defect list which describes correspondence between defective positions and replacement positions in every one of the recording layers.

In a preferred embodiment, the management information area includes a temporary disk management area, in which at least one temporary disk management structure for recording defect management information for keeping defective positions in the user data areas under management is assignable; and the temporary disk management structure contains a defect list which describes correspondence between defective positions and replacement positions in every one of the recording layers.

In a preferred embodiment, the management information area includes a recording management area in which recording management information indicating a recording status of every one of the three or more recording layers is stored.

In a preferred embodiment, when the user data area includes at least one defective area, the recording layer which is the most distant from the data-reading surface further includes at least one spare area, the at least one spare area including at least one replacement area to be used instead of the at least one defective area.

Another multi-layer information storage medium according to the present invention is a multi-layer information storage medium comprising: a data-reading surface; and three or more recording layers for recording data which is read out by using a light beam of a same wavelength, wherein, each recording layer has a user data area; and among the three or more recording layers, a recording layer whose user data area has audio/video data recorded therein is provided at a position which is not more distant from the data-reading surface than any recording layer whose user data area has data other than audio/video data recorded therein.

In a preferred embodiment, the data other than audio/video data is computer data.

An information apparatus according to the present invention is an information apparatus for executing at least one of: reproducing information from a multi-layer information storage medium having a plurality of recording layers; and recording information onto the multi-layer information storage medium, the information apparatus comprising: a motor for rotating the multi-layer information storage medium; an optical pickup for converging a light beam onto an arbitrary recording layer in the multi-layer information storage medium, and detecting reflected light from the recording layer; and a signal processing section for reproducing information which is recorded on the multi-layer information storage medium based on an output from the optical pickup, wherein, when the multi-layer information storage medium has three or more recording layers for recording data which is read out by using a light beam of a same wavelength, the information apparatus moves a converging point of the light beam to the recording layer which is the most distant from the data-reading surface among the three or more recording layers, and from a management information area recording management information concerning all of the recording layers, reads the management information.

In a preferred embodiment, the information apparatus moves the converging point of the light beam to a recording layer which is the most distant from the data-reading surface among the three or more recording layers of the multi-layer information storage medium, and updates the management information which is recorded in the management information area.

Another information apparatus according to the present invention is an information apparatus for executing at least one of: reproducing information from a multi-layer information storage medium having three or more recording layers; and recording information onto the multi-layer information storage medium, the information apparatus comprising: a motor for rotating the multi-layer information storage medium; an optical pickup for converging a light beam onto an arbitrary recording layer in the multi-layer information storage medium, and detecting reflected light from the recording layer; a signal processing section for reproducing information which is recorded on the multi-layer information storage medium based on an output from the optical pickup; means for determining whether data to be written to a user data area of the multi-layer information storage medium is audio/video data or not; and means for, among any usable user data areas in the multi-layer information storage medium, assigning a recording area by beginning from a user data area of a recording layer which is the most distant from a data-reading surface of the multi-layer information storage medium when it is determined that the data to be written is not audio/video data; and assigning a recording area by beginning from a user data area of a recording layer which is the closest to the data-reading surface of the multi-layer information storage medium when the data to be written is audio/video data.

An information reproduction method according to the present invention is an information reproduction method for reading information from a multi-layer information storage medium having a plurality of recording layers, the multi-layer information storage medium including one or more management information areas and a user data area from or to which user data is read or written, wherein at least one such management information area is provided in a recording layer which is the most distant from a data-reading surface of the multi-layer information storage medium, the information reproduction method comprising: a step of causing a focal point of laser light to follow along the recording layer which is the most distant from the data-reading surface of the multi-layer information storage medium and acquiring management information.

An information recording method according to the present invention is an information recording method for recording information onto a multi-layer information storage medium having a plurality of recording layers, the multi-layer information storage medium including one or more management information areas and a user data area from or to which user data is read or written, wherein at least one such management information area is provided in a recording layer which is the most distant from a data-reading surface of the multi-layer information storage medium, the information recording method comprising: a step of causing a focal point of laser light to follow along the recording layer which is the most distant from the data-reading surface of the multi-layer information storage medium and updating management information.

Alternatively, an information recording method according to the present invention is an information recording method for recording information onto a multi-layer information storage medium having a plurality of recording layers, the multi-layer information storage medium including: a user data area from or to which user data is read or written; and one or more spare areas including at least one replacement area to be used, when at least one defective area exists in the user data area, instead of the at least one defective area, wherein the one or more spare areas are provided in a recording layer which is the most distant from a data-reading surface of the multi-layer information storage medium, the information recording method comprising: a step of, when a defective area exists in the user data area, specifying at least one usable spare area among the one or more spare areas; and a step of replacing the defective area with a replacement area included in the at least one specified spare area.

In a preferred embodiment, the information recording method further comprises a step of specifying a spare area which is the closest to the defective area, among the at least one specified spare area.

Alternatively, an information recording method according to the present invention is an information recording method for recording information onto a multi-layer information storage medium having a plurality of recording layers, the multi-layer information storage medium including: a user data area from or to which user data is read or written; and one or more spare areas including at least one replacement area to be used, when at least one defective area exists in the user data area, instead of the at least one defective area, the information recording method comprising: (a) a step of, when a defective area exists in the user data area, specifying at least one usable spare area among the one or more spare areas; (b) a step of specifying, among the at least one spare area specified in step (a), at least one usable spare area in a recording layer which is the most distant from a data-reading surface of the multi-layer information storage medium; and (c) a step of replacing the defective area with a replacement area included in the at least one spare area specified in step (b).

In a preferred embodiment, the information recording method further comprises a step of specifying a spare area which is the closest to the defective area, among the at least one spare area specified in step (b).

Alternatively, an information recording method according to the present invention is an information recording method for recording information onto a multi-layer information storage medium having a plurality of recording layers, the multi-layer information storage medium including a user data area from or to which user data is read or written, the information recording method comprising: a step of determining whether data to be written to the multi-layer information storage medium is first data which requires a reliability or second data which requires less reliability than the first data; a step of, when the data to be written is determined as the first data, assigning a recording area within a usable portion of the user data area, by beginning from the user data area in the recording layer which is the most distant from a data-reading surface of the multi-layer information storage medium; and a step of, when the data to be written is determined as the second data, assigning a recording area within a usable portion of the user data area, by beginning from the user data area in the recording layer which is the closest to the data-reading surface of the multi-layer information storage medium.

An information recording apparatus according to the present invention is an information recording apparatus for recording information onto a multi-layer information storage medium having a plurality of recording layers, the multi-layer information storage medium including: a user data area from or to which user data is read or written; and one or more spare areas including at least one replacement area to be used, when at least one defective area exists in the user data area, instead of the at least one defective area, wherein the one or more spare areas are provided in a recording layer which is the most distant from a data-reading surface of the multi-layer information storage medium, the information recording apparatus comprising: means for, when a defective area exists in the user data area, specifying at least one usable spare area among the one or more spare areas; and means for replacing the defective area with a replacement area included in the at least one specified spare area.

In a preferred embodiment, the information recording apparatus further comprises means for specifying a spare area which is the closest to the defective area, among the at least one specified spare area.

Alternatively, an information recording apparatus according to the present invention is an information recording apparatus for recording information onto a multi-layer information storage medium having a plurality of recording layers, the multi-layer information storage medium including: a user data area from or to which user data is read or written; and one or more spare areas including at least one replacement area to be used, when at least one defective area exists in the user data area, instead of the at least one defective area, the information recording apparatus comprising: (a) means for, when a defective area exists in the user data area, specifying at least one usable spare area among the one or more spare areas; (b) means for specifying, among the at least one spare area specified by means (a), at least one usable spare area in a recording layer which is the most distant from a data-reading surface of the multi-layer information storage medium; and (c) means for replacing the defective area with a replacement area included in the at least one spare area specified by means (b).

In a preferred embodiment, the information recording apparatus further comprises means for specifying a spare area which is the closest to the defective area, among the at least one spare area specified by means (b).

According to the present invention, three or more recording layers are comprised. Therefore, the amount of recordable data is increased. Since read errors in management information are unlikely to occur due to scratches and/or soil on the disk surface, a highly reliable multi-layer information storage medium and a highly reliable information apparatus are provided.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
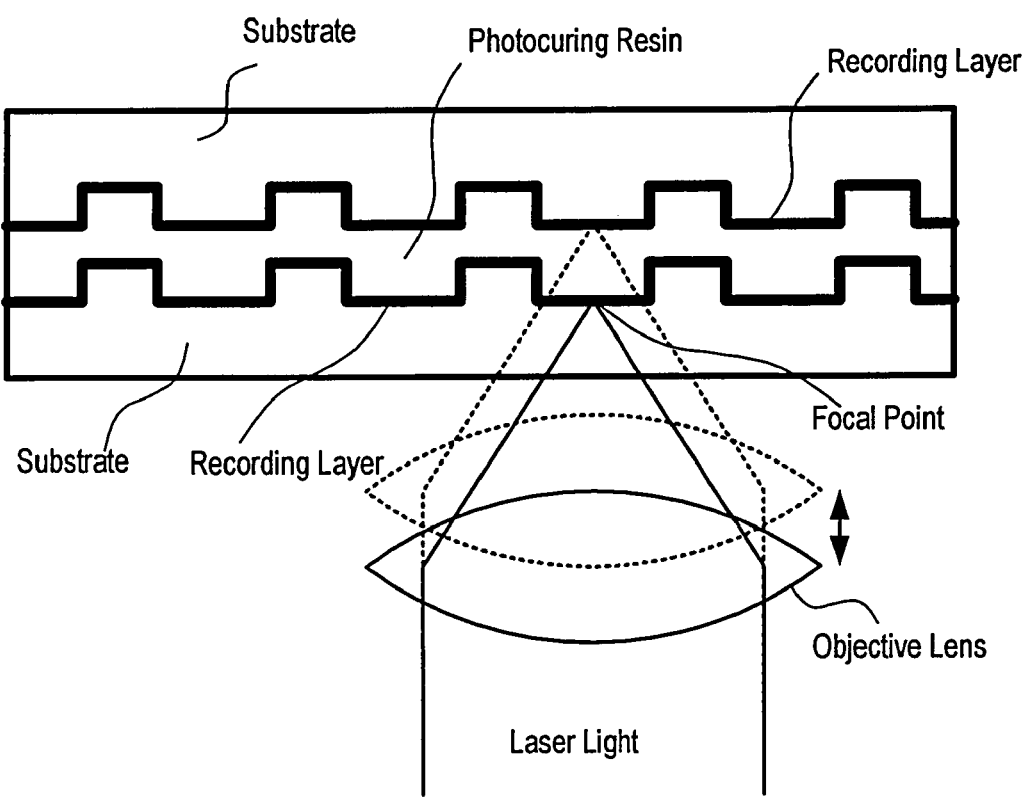
FIG. 1 is a diagram illustrating a reproduction principle for an optical disk having two recording layers.

Since the amount of data to be recorded on one optical disk has been increasing, development efforts for multi-layer optical disk having three or more recording layers have been undertaken. When there are three or more recording layers, it becomes very important how to handle the management information for each recording layer.

In the present invention, management information concerning all recording layers is recorded on a recording layer which is the most distant from the data-reading surface, rather than a recording layer which is the closest to the data-reading surface. In a construction comprising a multitude of stacked recording layers, optical transmittance is more likely to fluctuate as the distance from the data-reading surface increases, because a light beam will have traversed more recording layers. Moreover, as described in Japanese Laid-Open Patent Publication No. 2004-206849, supra, the influence of tilt becomes greater as the distance from the data-reading surface increases. As a result of this, it is usually considered preferable to record management information in the recording layer which is the closest to the data-reading surface, or record management information redundantly in each and every recording layer.

However, according to a study by the inventors, the influence of tilt becomes smaller at the inner periphery side than at the outer periphery side of the disk. Thus, it has been found that, even if a management area is provided at a recording layer which is distant from the data-reading surface, the influence of tilt can be reduced to a level which is much less problematic than is commonly expected, so long as a management area for recording management information is provided at the inner periphery side of the disk. There is also an advantage in that the influence of scratches and/or soil on the disk surface is more effectively reduced as the distance from the data-reading surface increases. Furthermore, it is relatively easy to achieve focus lock-in on the most distant recording layer. When achieving focus lock-in by moving the focal point of a light beam from the data-reading surface to deeper (i.e., more rearward) positions while detecting a focus error signal, it is possible to detect which recording layer the focal point of the light beam is located on, by counting the number of "S" curves. At this time, it is easier to detect a recording layer which is located at the deepest (i.e., rearmost) position than a recording layer which is located at the foremost position for the following reason. The disk surface itself may sometimes create a small "S" curve in the focus error signal, thus causing an error in the number of counts as to how many recording layers have been traversed. On the other hand, the recording layer which is at the deepest position can be detected with a high accuracy than any other recording layer because no more "S" curves will appear at deeper positions.

Hereinafter, preferable embodiments of the present invention will be described with reference to the drawings.

Embodiment 1

First, a multi-layer information storage medium and an information apparatus according to a first embodiment of the present invention will be described.

Figure 6:
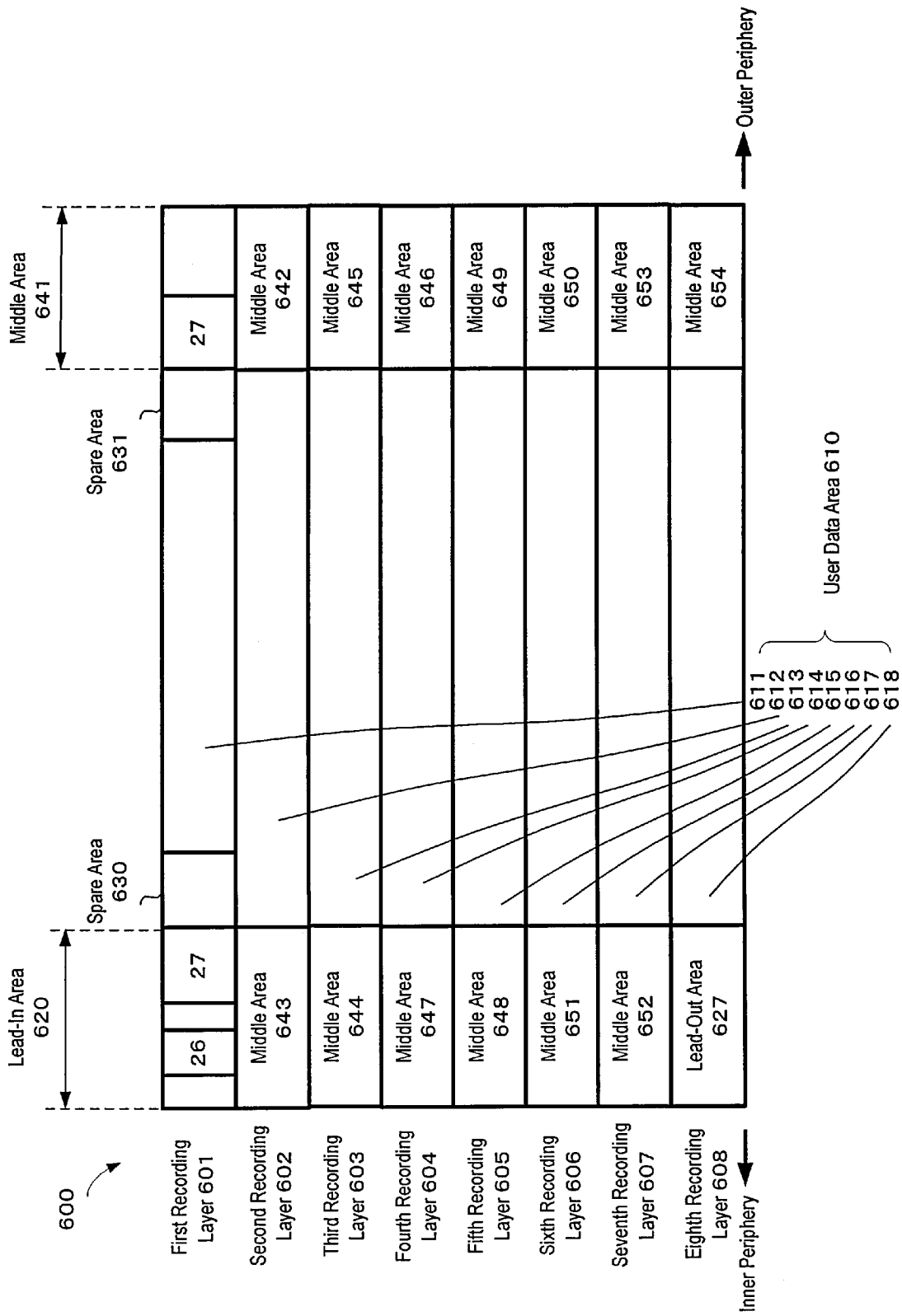
FIG. 6 is a diagram showing an area-layout of a multi-layer information storage medium according to Embodiment 1 of the present invention.

Referring to FIG. 6, an area-layout of a multi-layer information storage medium 600 according to the present embodiment is shown. The multi-layer information storage medium 600 includes eight recording layers 601, 602, . . . , 608. In the present specification, the plurality of recording layers 601 to 608 will be referred to as, respectively, the first recording layer, second recording layer, . . . , and eighth recording layer, in a descending order of distance from the data-reading surface of the multi-layer information storage medium 600. Thus, the first recording layer 601 is the most distant from the data-reading surface in this example.

Each of the recording layers 601 to 608 in the present embodiment has a multilayer structure, including a recording film composed of a known phase-change type recording material or organic dye material, and a reflection film. The multi-layer information storage medium 600 has a cross-sectional structure as shown in shown in FIG. 21, where at least one substrate 600a supports the eight recording layers and a transparent layer 600b protects the recording layers. Each of the eight recording layers 601 to 608 in the present embodiment is at a distance in the range from 0 μm to 120 μm from the data-reading surface. Data reproduction is performed by using a light beam which preferably has a wavelength of 410 nm or less (and more specifically, 405 nm).

Figure 21:
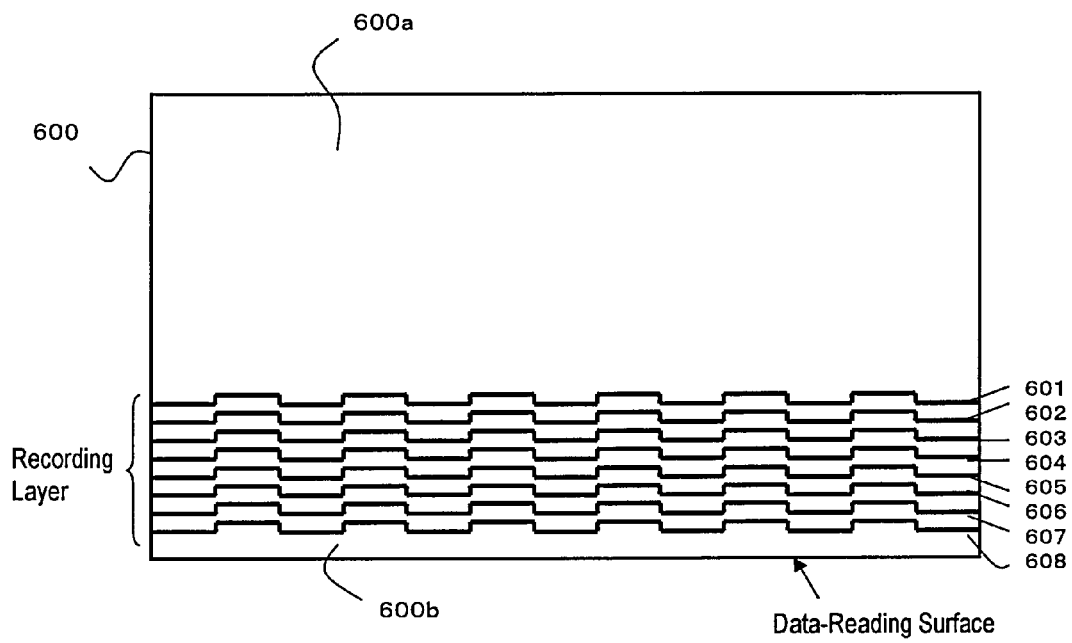
FIG. 21 is a diagram schematically showing an exemplary cross-sectional structure of a multi-layer information storage medium according to the present invention.
Figure 22:
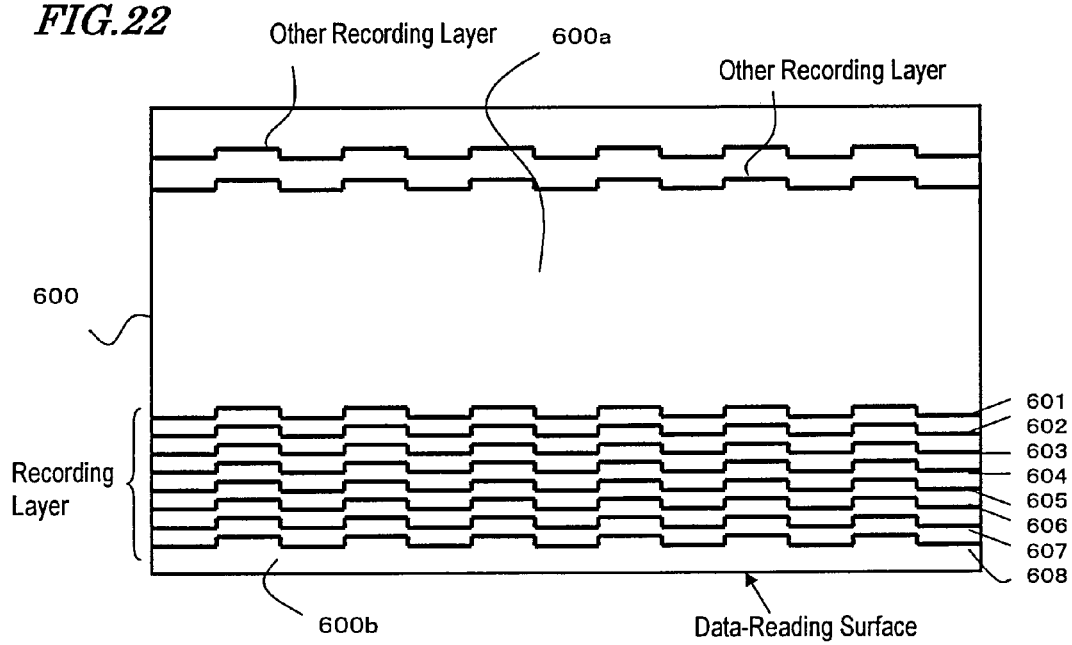
FIG. 22 is a diagram schematically showing another exemplary cross-sectional structure of a multi-layer information storage medium according to the present invention.

Each recording layer of the multi-layer information storage medium according to the present embodiment or any of the below-described embodiments has a structure in accordance with the Blu-ray standard or the next-generation DVD standards, for example. In other words, a bump-dent structure (land/groove structure) as shown in FIG. 21 exists in each recording layer. Note that, in addition to the eight recording layers 601 to 608, the multi-layer information storage medium 600 may also include a recording layer(s) for which data recording/reproduction is to be performed by using a light beam of another wavelength (e.g., red light and and/or infrared light). Specifically, as shown in FIG. 22, in addition to the eight recording layers located at positions relatively close to the data-reading surface, another recording layer(s) for which data recording/reproduction is to be performed by using laser light of a longer wavelength may be provided at a relatively far position(s) from the data-reading surface.

The multi-layer information storage medium 600 has a user data area 610 for recording user data, which is allocated among the recording layers 601 to 608. The first recording layer 601 includes, from the inner periphery side toward the outer periphery side, a lead-in area 620, a spare area 630, a first user data area 611 (which is a part of the user data area 610), a spare area 631, and a middle area 641. The second recording layer 602 includes, from the outer periphery side toward the inner periphery side, a middle area 642, a second user data area 612 (which is a part of the user data area 610), and a middle area 643. The third to sixth recording layers are similarly structured. The seventh recording layer 607 includes, from the inner periphery side toward the outer periphery side, a middle area 652, a seventh user data area 617 (which is a part of the user data area 610), and a middle area 653. The eighth recording layer 608 includes, from the outer periphery side toward the inner periphery side, a middle area 654, an eighth user data area 618 (which is a part of the user data area 610), and a lead-out area 627.

The lead-in area 620, which is a part of the first recording layer 601, includes a disk information area 26 and a defect management area 27. The disk information area 26 and the defect management area 27 function as "management information areas" for recording "management information". In the present specification, "management information" means parameters which are necessary for performing data recording/reproduction, information concerning physical properties, and defect management information. The parameters which are necessary for performing data recording/reproduction and the information concerning physical properties may have different contents as individually recommended for the respective recording layers 601, 602, . . . , 608.

The parameters which are necessary for performing recording/reproduction include: information of recommended irradiation power during reproduction; information of recommended irradiation power during recording; information of maximum irradiation power; pulse width during recording; and the like. The information concerning physical properties includes: a disk type; disk size; version information; a total number of recordable layers; a total number of read-only layers; a total number of all layers; a transfer rate; directions of recording/reproduction; the first physical address; the last physical address; the first logical address; the last logical address; shortest mark length; recording velocities; and the like.

Figure 2:
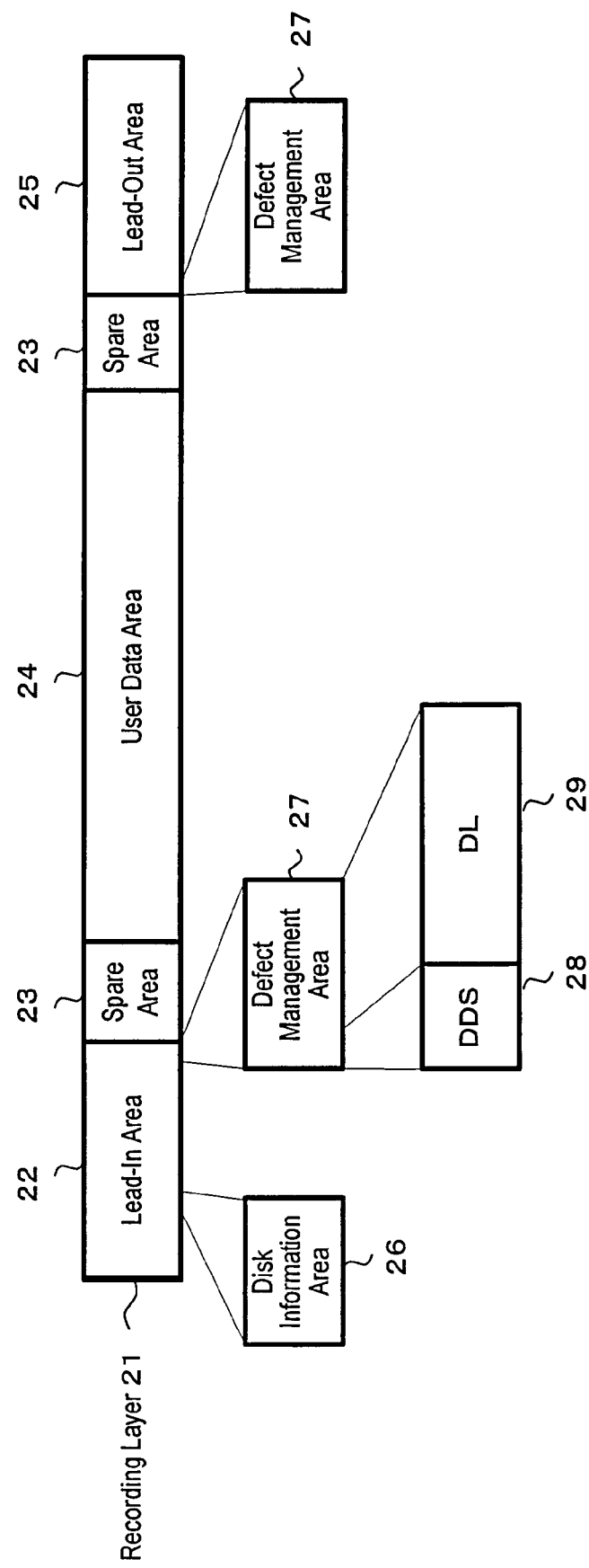
FIG. 2 is a diagram showing an area-layout of a recording layer of a conventional rewritable optical disk.

The middle area 641 includes: a defect management area 27; and an area for recording predetermined bits of information for preventing tracking failure immediately before or after reproducing data from the user data area. The defect management area 27 contains DDS 28 and DL 29 as shown in FIG. 2.

In the disk information area 26 which is provided in the lead-in area 620 of the first recording layer 601, parameters which are necessary for performing recording/reproduction and information concerning physical properties are recorded with respect to all of the recording layers 601, 602, . . . , 608. The parameters which are necessary for performing recording/reproduction include: information of recommended irradiation power during reproduction; information of recommended irradiation power during recording; information of maximum irradiation power; pulse width during recording; and the like. The information concerning physical properties includes: a disk type; disk size; version information; a total number of recordable layers; a total number of read-only layers; a total number of all layers; a transfer rate; directions of recording/reproduction; the first physical address; the last physical address; the first logical address; a logical address; shortest mark length; recording velocities; and the like.

In the present embodiment, since the disk information area 26 is provided in the first recording layer, which is the most distant from the data-reading surface, the reliability of the data in the disk information area 26 can be improved. Thus, a highly reliable multi-layer storage medium can be provided.

The defect management area 27 provided in the lead-in area 620 of the first recording layer 601 contains defect management information concerning defect management as to all of the recording layers 601, 602, . . . , 608. The DL 29 in the defect management area 27 includes paired listings of positions of defective sectors and positions of their corresponding replacement sectors (serving as destinations of replacement), with respect to all of the recording layers 601, 602, . . . , 608. Since the defect management area 27 is provided in the first recording layer 601, which is the most distant from the data-reading surface, the reliability of the data in the defect management information can be improved.

The spare areas 630 and 631, which are provided in the first recording layer 601, contain spare sectors for the defective sectors in all of the recording layers 601, 602, . . . , 608. Since the spare areas 630 and 631 are provided in the first recording layer 601, which is the most distant from the data-reading surface, the reliability of the data in the replacement sector can be improved.

As described above, according to the present embodiment, an improved reliability can be attained in a multi-layer information storage medium including eight recording layers. Note that the present invention is not limited to an information storage medium including eight recording layers, but is applicable to an information storage medium including three or more recording layers.

Although the disk information area 26 and the defect management areas 27 are provided only in the first recording layer in the present embodiment, they may be provided in any recording layer other than the first recording layer 601. However, from the perspective of providing improved reliability, it is desirable to that the disk information area 26 and the defect management areas 27 are provided in a recording layer which is as distant from the data-reading surface as possible. In the case where the multi-layer information storage medium includes (2×N−1) or (2×N) recording layers (where N is an integer equal to or greater than two), it is preferable that the disk information area 26 and the defect management areas 27 are provided only in the first to $N^{th}$ recording layers.

Alternatively, the spare areas 630 and 631 may be provided in at least one of the recording layers 602 to 608 other than the first recording layer 601. From the perspective of providing improved reliability, it is desirable that the spare areas 630 and 631 are provided in a recording layer which is relatively distant from the data-reading surface. In the case where the multi-layer information storage medium includes (2×N−1) or (2×N) recording layers (where N is an integer equal to or greater than two), it is again preferable that the spare areas 630 and 631 are provided only in the first to $N^{th}$ recording layers. Note that the spare areas 630 and 631 are not indispensable, and their size may be made zero. Moreover, the size of the spare area 631 provided in the outer periphery side may be designed to be increasable.

Furthermore, a write protection information management area for storing protection information (which indicates whether data is recordable or unrecordable to the multi-layer information storage medium) may be provided, at least in the first recording layer 601.

Figure 7:
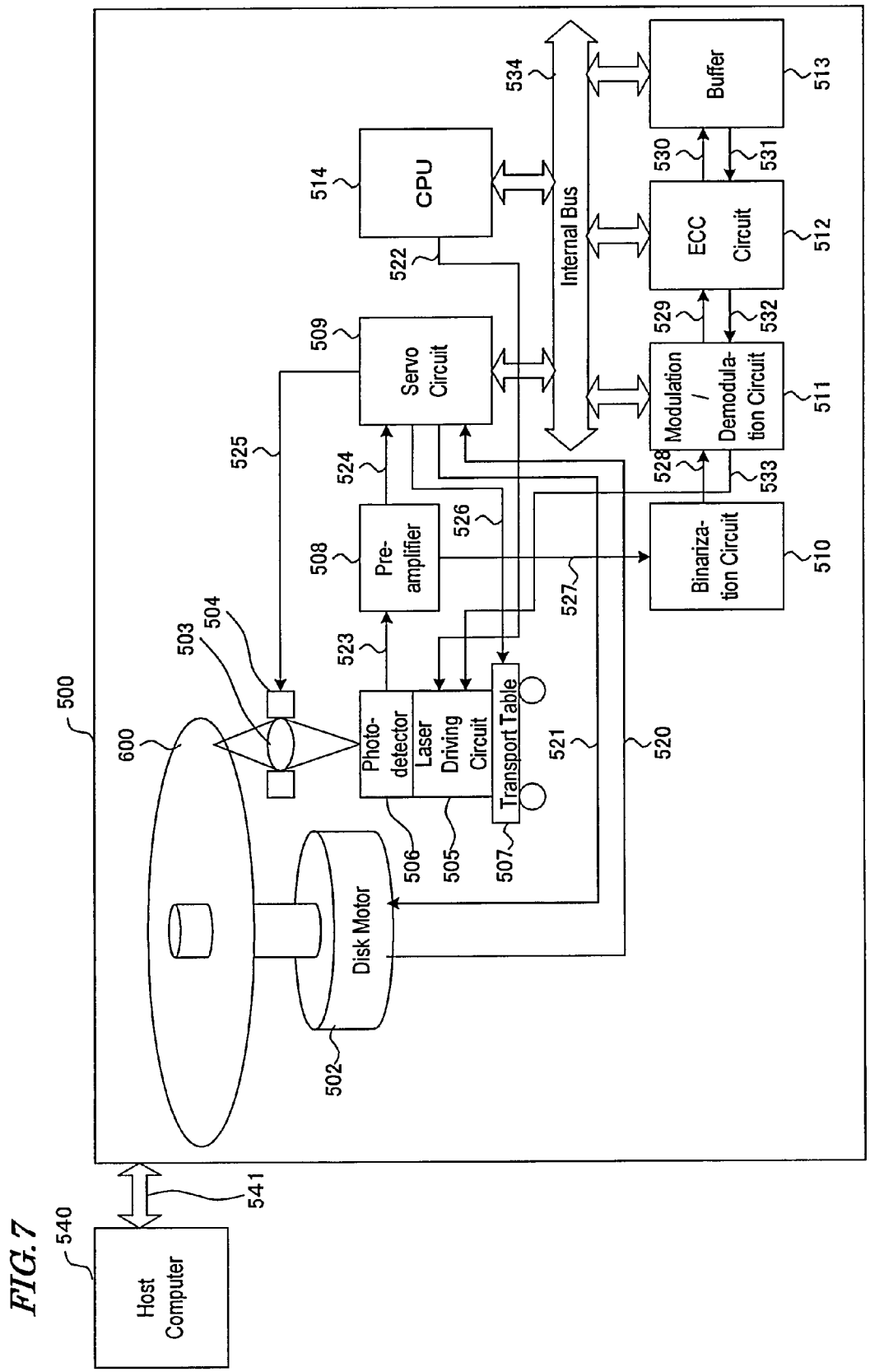
FIG. 7 is a block diagram showing an exemplary construction of a recording/reproduction system according to Embodiment 1 of the present invention.

FIG. 7 is a diagram showing the construction of an information apparatus according to an embodiment of the present invention. The information apparatus of the present embodiment is an optical disk recording/reproduction system. This recording/reproduction system is composed of an information recording/reproduction apparatus 500 and a host computer 540.

The information recording/reproduction apparatus 500 of FIG. 7 includes an optical head device (optical pickup) capable of making optical access to the multi-layer information storage medium 600, which is rotated by a disk motor 502. This optical head device includes: a lens 503 for converging laser light (wavelength: about 405 nm) that is radiated from a semiconductor laser (not shown); an actuator 504 capable of changing the position and posture of the lens 503; a photodetector 506 for detecting reflected light from the multi-layer information storage medium 600; a laser driving circuit 505 for driving the semiconductor laser; and a transport table 507 for supporting these constituent elements.

The signal processing section includes a preamplifier 508, a servo circuit 509, a binarization circuit 510, a modulation/demodulation circuit 511, an ECC circuit 512, a buffer 513, and a CPU 514 as shown in FIG. 7.

In accordance with an internalized control program, the CPU 514 controls the overall operation of the information recording/reproduction apparatus 500 via an internal bus 534. Moreover, the CPU 514 sends a transport table driving signal 526 to the transport table 507 in order to control the position of the transport table 507 along the disk radial direction.

Based on a laser emission permission signal 522 from the CPU 514, the laser driving circuit 505 drives the semiconductor laser so as to irradiate the multi-layer information storage medium 600 with laser light. The reflected light from the multi-layer information storage medium 600 enters the photodetector 506, and the photodetector 506 generates a light detection signal 523 based on the reflected light. By subjecting the light detection signal 523 to addition/subtraction calculations, the preamplifier 508 generates a servo error signal 524 and an analog data signal 527 from the light detection signal 523.

The analog data signal 527 is subjected to an A/D (analog/digital) conversion by the binarization circuit 510 to become a binarized data signal 528. The binarized data signal 528 is demodulated by the modulation/demodulation circuit 511, thus becoming a demodulated data signal 529. The demodulated data signal 529 is converted by the ECC circuit 512 into a corrected data signal 530, which is error-free, and is stored to the buffer 513.

The servo error signal 524 is fed back by the servo circuit 509 to the actuator 504 as an actuator driving signal 525. The actuator 504 drives the lens 503 based on the actuator driving signal 525. Thus, focusing control and tracking control are realized. A rotation detection signal 520 which represents the rotation state of the disk motor 502 is sent to the servo circuit 509. From the servo circuit 509, a disk motor driving signal 521 is also output, and the operation of the disk motor 502 is controlled by the disk motor driving signal 521.

Data which is stored in the buffer 513 is output from the buffer 513 as a stored data signal 531, and is input to the ECC circuit 512. An error correction code is added to the stored data signal 531 at the ECC circuit 512, whereby the stored data signal 531 becomes an encoded data signal 532. The encoded data signal 532 is modulated by the modulation/demodulation circuit 511, thus becoming a modulated data signal 533. The laser driving circuit 505 modulates the power of laser light based on the modulated data signal 533.

When used as a computer peripheral device (e.g., a DVD-ROM drive), the information recording/reproduction apparatus 500 includes a host interface circuit, and via a host interface bus 541 such as SCSI (Small Computer System Interface), allows data exchange between the buffer 513 and the host computer 540. On the other hand, when used as a consumers' device such as a DVD player, a host computer 540 includes an AV decoder/encoder circuit (not shown) for decompressing or compressing moving pictures and/or audio, and allows data exchange with the buffer 513.

Figure 8:
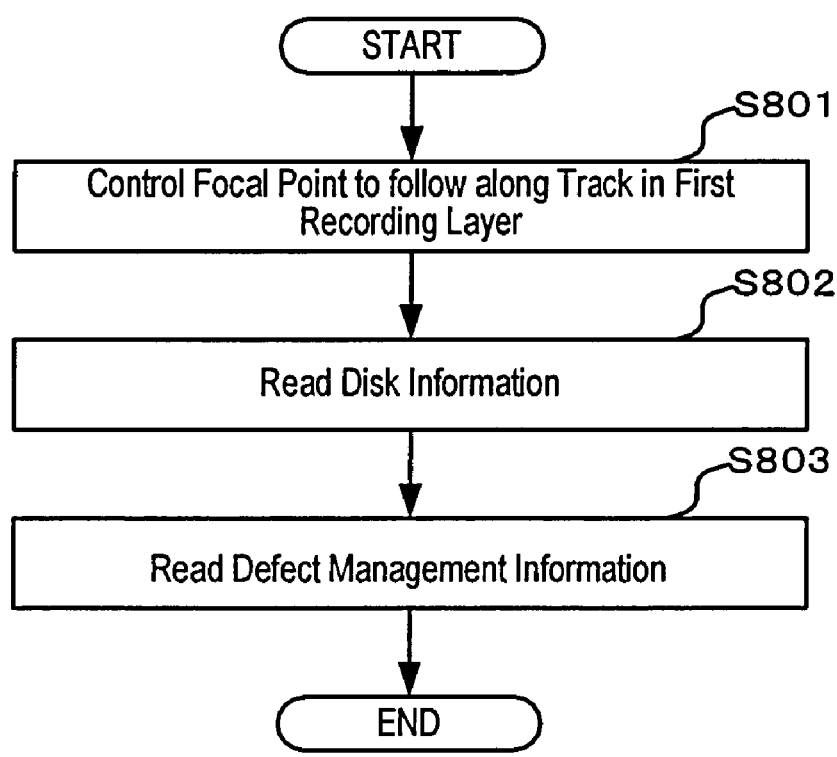
FIG. 8 is a flowchart showing a procedure of acquiring disk information and defect management information, performed by an information recording/reproduction apparatus according to Embodiment 1 of the present invention.

Next, with reference to FIG. 8, a procedure of acquiring of disk information and defect management information, which is performed by the information recording/reproduction apparatus 500, will be described.

First, at step S801, the CPU 514 instructs the servo circuit 509 to control a focal point of laser light to follow along a track on the first recording layer. Next, at step S802, a sector in which disk information is stored is reproduced, and the disk's parameters which are necessary for performing recording/reproduction and information concerning physical properties are confirmed. At step S803, a sector in which defect management information is stored is reproduced, and the reproduced data therefrom is retained in a predetermined position in the buffer 513.

Figure 9:
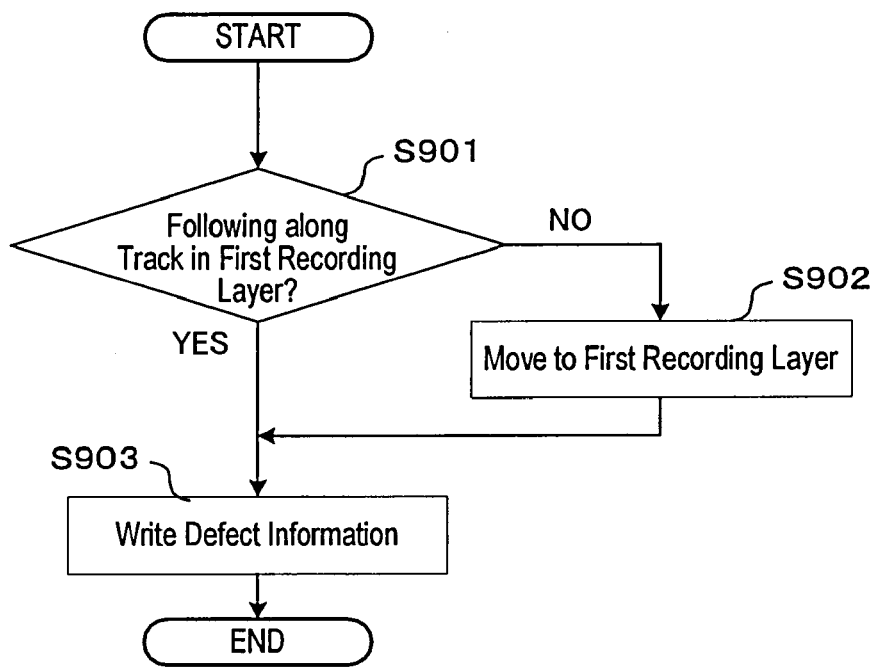
FIG. 9 is a flowchart showing a procedure of updating defect management information, performed by an information recording/reproduction apparatus according to Embodiment 1 of the present invention.

Next, with reference to FIG. 9, a procedure of updating defect management information, which is performed by the information recording/reproduction apparatus 500, will be described.

First, at step S901, the CPU 514 determines whether a focal point of laser light is following along a track in the first recording layer, and if it is following along a track in the first recording layer, control proceeds to a process of step S903, and otherwise proceeds to a process of step S902. At step S902, the CPU 514 instructs the servo circuit 509 to control the focal point of laser light to follow along a track in the first recording layer. At step S903, defect management information containing DDS 28 and DL 29 is recorded to a sector included in the defect management area 27.

Next, with reference to FIG. 10, a spare sector assignment process which is performed by the information recording/reproduction apparatus 500 will be described.

The spare sector assignment process includes: a process of specifying at least one usable spare area among the one or more spare areas of the multi-layer information storage medium 600; and a process of selecting a spare area which is the closest to a defective sector from among the at least one specified spare area.

First, at step S1001, the CPU 514 determines whether or not there is any usable spare area on the multi-layer information storage medium 600. If there is no usable spare area, it is determined that assignment is impossible and the assignment process is ended. If there is any usable spare area, control proceeds to a process of step S1002.

At step S1002, the CPU 514 determines whether the radial position of the defective sector is closer to the spare area provided at the inner periphery side or the spare area provided at the outer periphery side. If the radial position of the defective sector is closer to the spare area provided at the inner periphery side, control proceeds to a process of step S1003. If the radial position of the defective sector is closer to the spare area provided at the outer periphery side, control proceeds to a process of step S1004.

At step S1003, the CPU 514 determines whether the spare area provided at the inner periphery side is usable or not. If the spare area provided at the inner periphery side is usable, control proceeds to a process of step S1005, and otherwise proceeds to a process of step S1006.

At step S1004, the CPU 514 determines whether the spare area provided at the outer periphery side is usable or not. If the spare area provided at the outer periphery side is usable, control proceeds to a process of step S1006, and otherwise proceeds to a process of step S1005.

At step S1005, the CPU 514 assigns a spare sector which is included in the spare area provided at the inner periphery side of the first recording layer to the defective sector.

At step S1006, the CPU 514 assigns a spare sector which is included in the spare area provided at the outer periphery side of the first recording layer to the defective sector.

Figure 10:
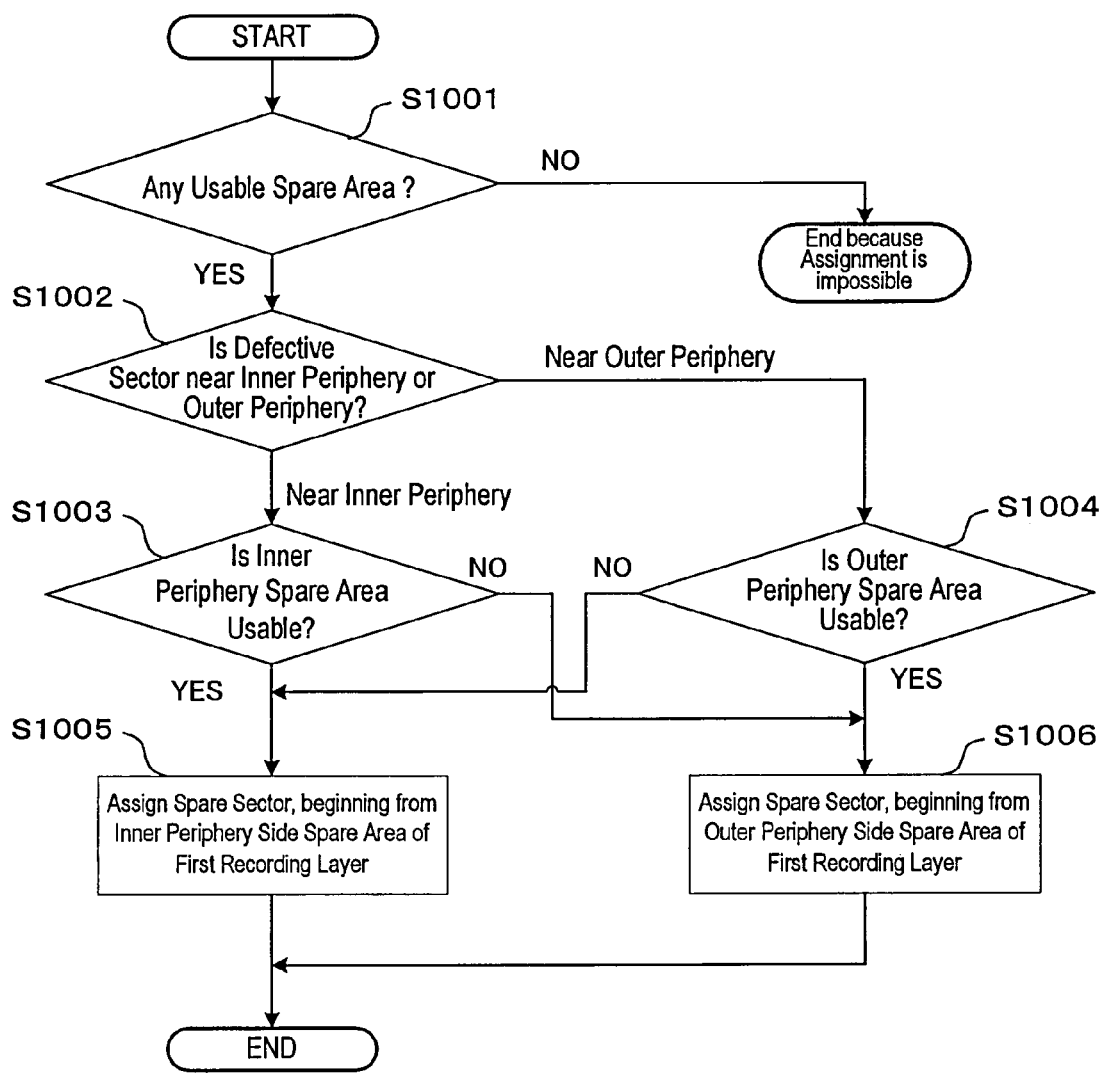
FIG. 10 is a flowchart showing a spare sector assignment process, performed by an information recording/reproduction apparatus according to Embodiment 1 of the present invention.

In the spare sector assignment process illustrated in FIG. 10, it is ensured that a spare sector which is included in the spare area whose radial distance from the sector position of the defective sector is as short as possible is used. Since the radial distance is short, the seek operation time along the radial direction (which involves moving of the transport table 507) can be reduced. Any other assignment process procedure may be employed so long as it meets the objective of using a spare sector that is included in a spare area whose radial distance from the sector position of the defective sector is as short as possible.

Note that, in the case where there is no need to reduce the seek operation time, it is not necessary to use a spare sector that is included in a spare area whose radial distance from the sector position of the defective sector is as short as possible.

Next, with reference to FIG. 11, a spare sector assignment process for an information storage medium in which spare areas are provided not only in a first recording layer but also in a recording layer other than the first recording layer, performed by the information recording/reproduction apparatus 500, will be described.

At the first step S1101 of the spare sector assignment process, the CPU 514 determines whether there is any usable spare area on the multi-layer information storage medium 600. If there is no usable spare area, it is determined that assignment is impossible and the assignment process is ended. If there is any usable spare area, control proceeds to a process of step S1102.

At step S1102, the CPU 514 sets the first recording layer as a recording layer in which to search for a spare sector, so that the spare areas in the first recording layer will be used with a higher priority.

At step S1103, the CPU 514 determines whether or not there is any usable spare area in the recording layer in which to search for a spare sector. If there is no usable spare area, control proceeds to a process of step S1104. If there is any usable spare area, control proceeds to a process of step S1105.

At step S1104, the next layer is set as a recording layer in which to search for a spare sector, and control proceeds to a process of S1103.

At step S1105, the CPU 514 determines whether the radial position of the defective sector is closer to the spare area provided at the inner periphery side or the spare area provided at the outer periphery side. If the radial position of the defective sector is closer to the spare area provided at the inner periphery side, control proceeds to a process of step S1106. If it is closer to the spare area provided at the outer periphery side, control proceeds to a process of step S1107.

At step S1106, the CPU 514 determines whether the spare area provided at the inner periphery side is usable or not. If the spare area provided at the inner periphery side is usable, control proceeds to a process of step S1108, and otherwise proceeds to a process of step S1109.

At step S1107, the CPU 514 determines whether the spare area provided at the outer periphery side is usable or not. If the spare area provided at the outer periphery side is usable, control proceeds to a process of step S1109, and otherwise proceeds to a process of step S1108.

At step S1108, for the defective sector, the CPU 514 assigns a spare sector which is included in the spare area provided at the inner periphery side of the searched recording layer.

At step S1109, for the defective sector, the CPU 514 assigns a spare sector which is included in the spare area provided at the outer periphery side of the searched recording layer.

Figure 11:
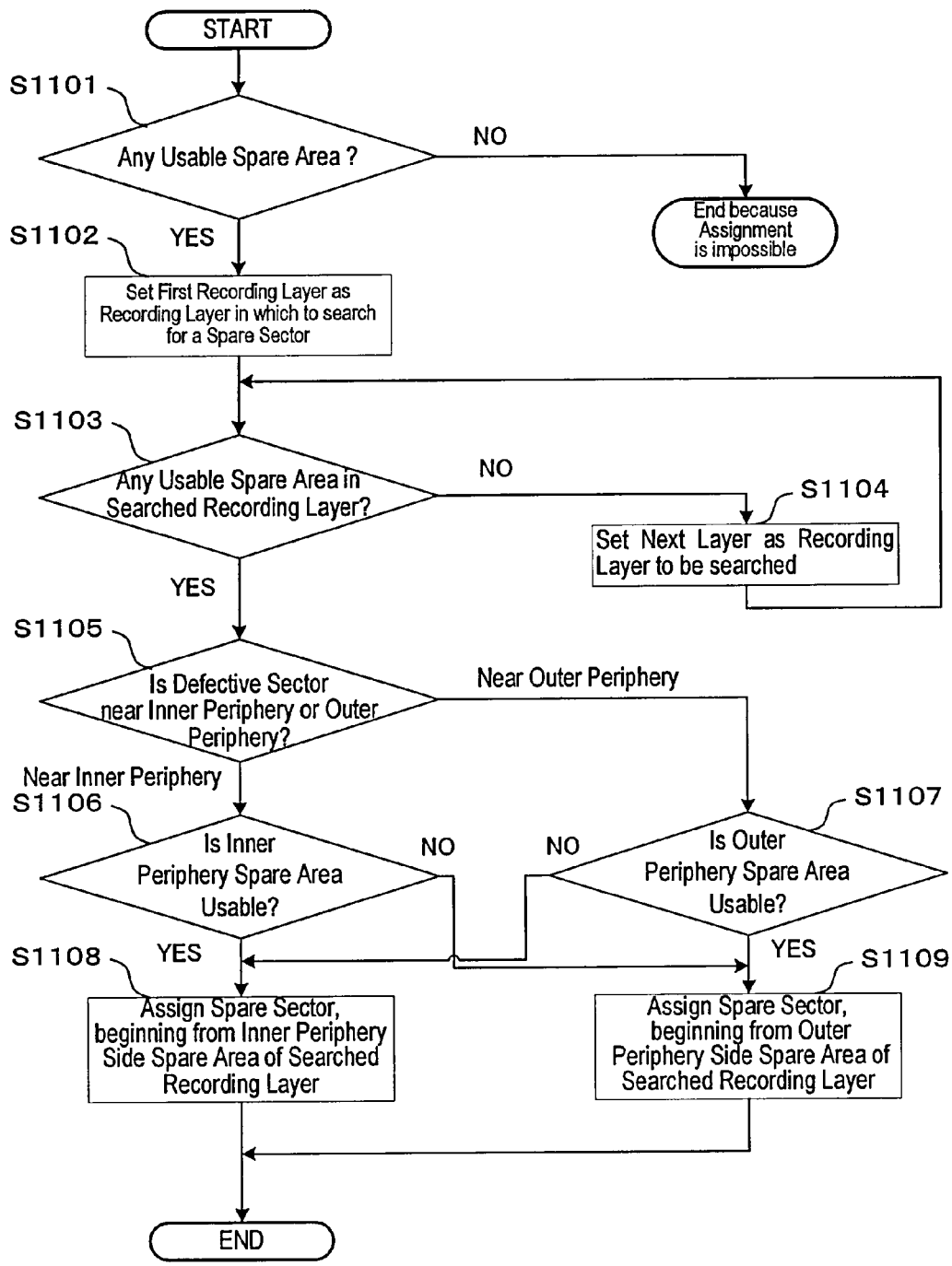
FIG. 11 is a flowchart showing a spare sector assignment process for an information storage medium in which spare areas are provided not only in a first recording layer but also in a recording layer other than the first recording layer, performed by an information recording/reproduction apparatus according to Embodiment 1 of the present invention.

The spare sector assignment process shown in FIG. 11 utilizes, among the spare sectors in the spare areas of a recording layer whose distance from the data-reading surface is as long as possible, a spare sector in a spare area whose radial distance from the sector position of the defective sector is as short as possible.

By providing spare areas in a recording layer whose distance from the data-reading surface is relatively long, the reliability of the data in the replacement sector can be improved. By reducing the radial distance, the seek operation time along the radial direction, which involves moving of the transport table 507, can be reduced.

In the present embodiment, a spare sector that is included in a spare area whose radial distance from the sector position of the defective sector is short is used. Alternatively, the spare sector assignment process may take any other factor into consideration (e.g., the amount of time which is required when changing the rotation speed of the motor) in choosing a spare sector which results in the shortest access time.

In the case where there is no need to reduce the seek operation time, it is not necessary to use a spare sector that is included in a spare area whose radial distance from the sector position from the defective sector is as short as possible.

Embodiment 2

Next, a second embodiment of the present invention will be described. A multi-layer information storage medium according to the present embodiment is a write-once optical disk, thus differing from the storage medium of the first embodiment.

Figure 3:
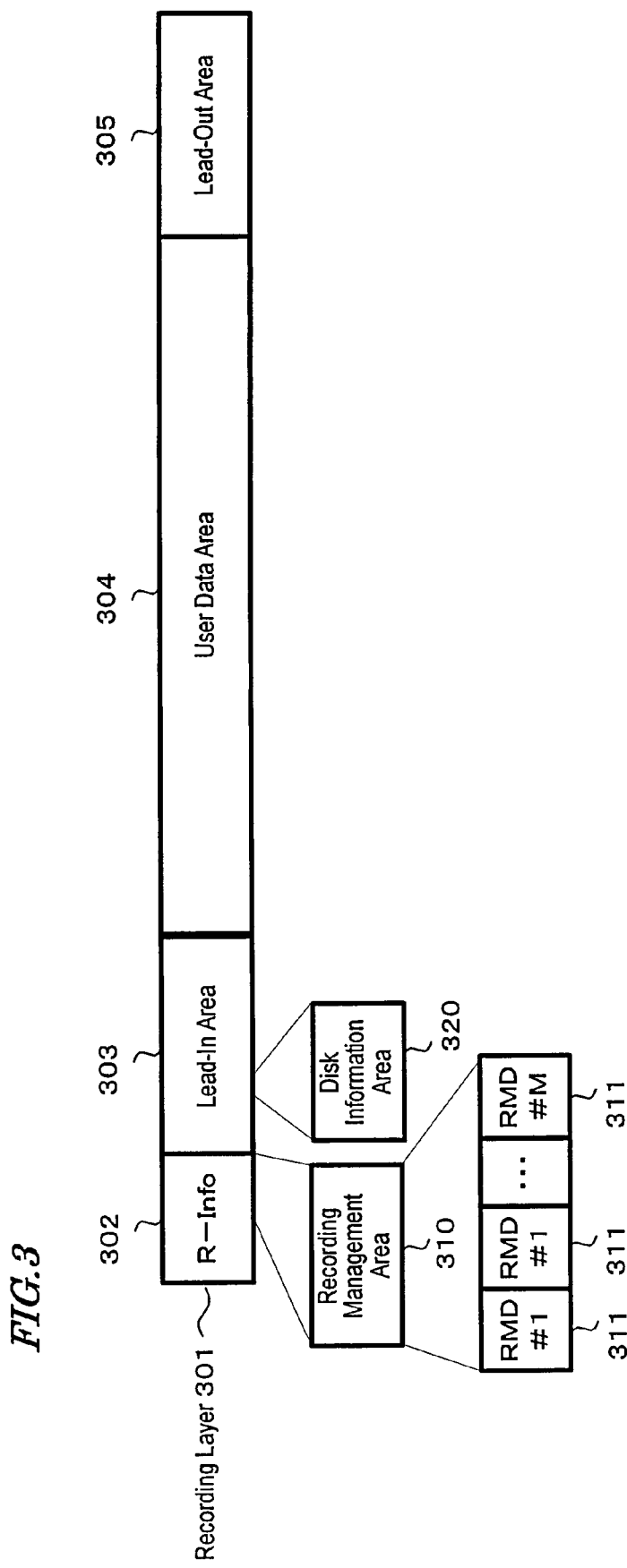
FIG. 3 is a diagram showing an area-layout of a recording layer of a DVD-R as a conventional write-once optical disk.
Figure 12:
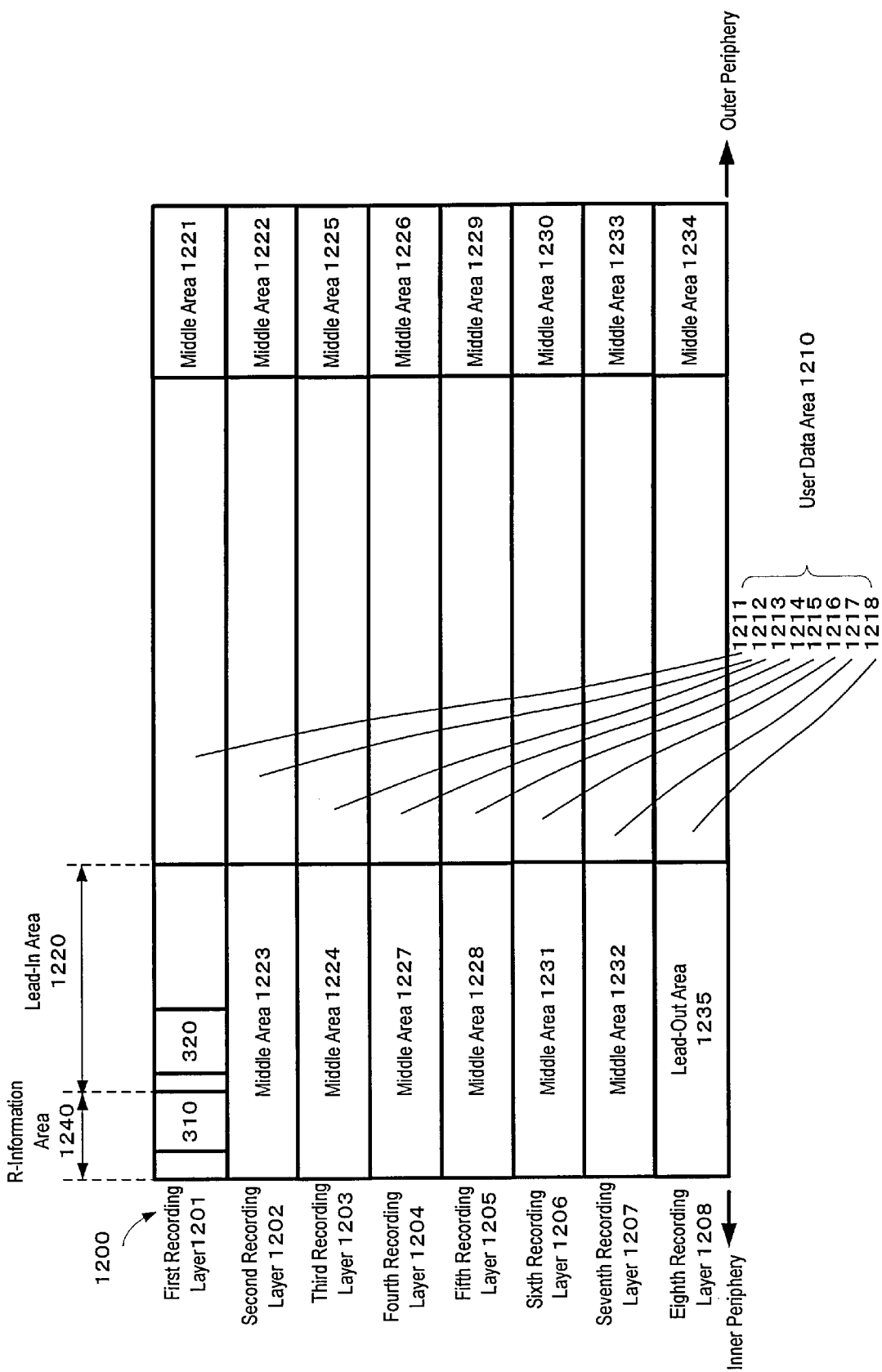
FIG. 12 is a diagram showing an area-layout of a multi-layer information storage medium according to Embodiment 2 of the present invention.

FIG. 12 shows an area-layout of a multi-layer information storage medium 1200 according to the present embodiment. The multi-layer information storage medium 1200 basically has a construction which is similar to the construction shown in FIG. 21, and includes eight recording layers 1201, 1202, . . . , and 1208. Since the multi-layer information storage medium 1200 is a write-once medium, it includes a recording management area 310 and a disk information area 320 as shown in FIG. 3 in its first recording layer.

The multi-layer information storage medium 1200 has a user data area 1210 for recording user data, which is allocated among the respective recording layers. The first recording layer 1201 includes, from the inner periphery side toward the outer periphery side, an R-information area 1240, a lead-in area 1220, a first user data area 1211 (which is a part of the user data area 1210), and a middle area 1221. The second recording layer 1202 includes, from the outer periphery side toward the inner periphery side, a middle area 1222, a second user data area 1212 (which is a part of the user data area 1210), and a middle area 1223. The third to sixth recording layers are similarly structured. The seventh recording layer 1207 includes, from the inner periphery side toward the outer periphery side, a middle area 1232, a seventh user data area 1217 (which is a part of the user data area 1210), and a middle area 1233. The eighth recording layer 1208 includes, from the outer periphery side toward the inner periphery side, a middle area 1234, an eighth user data area 1218 (which is a part of the user data area 1210), and a lead-out area 1235.

The R-information area 1240 provided in the first recording layer 1201 includes an RMA 310, which is composed of RMD. The lead-in area 1220 includes a disk information area 320 for recording management information concerning the eight recording layers 1201 to 1208. Since the R-information area 1240 is provided in the first recording layer 1201, which is the most distant from the data-reading surface, the reliability of the data in the R-information area 1240 can be improved.

Although the storage medium according to the present embodiment is illustrated as comprising eight recording layers, the present invention is generally applicable to the case where three or more recording layers are comprised.

In the R-information area 1240 or the RMD 310, a write protection information management area for storing protection information (which indicates whether data is recordable or unrecordable to the multi-layer information storage medium 1200) may be provided.

The recording management data is not limited to RMD, but may be FDCB or SDCB, for example, and may be provided in the lead-in area 1220 of the first recording layer 1201.

In the case where the multi-layer information storage medium 1200 includes (2×N−1) or (2×N) recording layers (where N is an integer equal to or greater than two), it is preferable that the recording management data is provided only in the first to $N^{th}$ recording layers.

Figure 13:
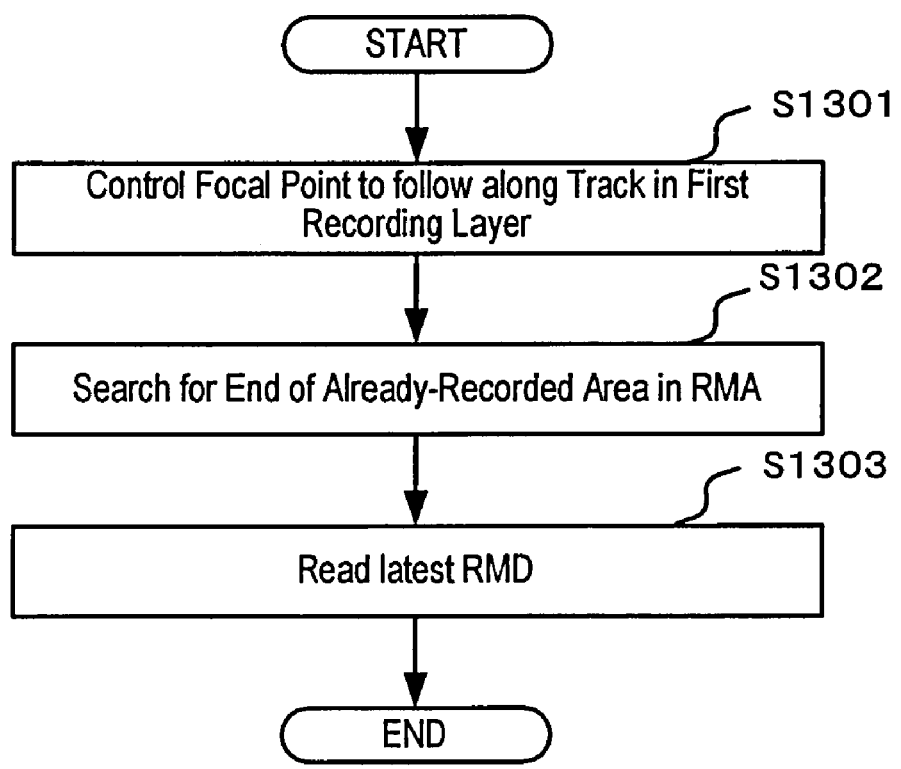
FIG. 13 is a flowchart showing a procedure of acquiring recording management data RMD from RMA, performed by an information recording/reproduction apparatus according to Embodiment 2 of the present invention.

Next, with reference to FIG. 13, a procedure of acquiring recording management data (RMD) from the RMA 310 of the multi-layer information storage medium 1200, performed by the information recording/reproduction apparatus 500 shown in FIG. 7, will be described.

First, at step S1301, the CPU 514 instructs the servo circuit 509 to control a focal point of laser light to follow along a track in the first recording layer 1201.

At step S1302, the end of the already-recorded area in the RMA 310 is searched for. Based on a reproduction signal or the like from the multi-layer storage medium, the information recording/reproduction apparatus 500 sequentially distinguishes an already-recorded area from an unrecorded area, thus searching for a boundary between the already-recorded area and the unrecorded area.

At step S1303, the information recording apparatus determines that the final area of the already-recorded area is the latest RMD, and executes a read process. Based on the content of the latest RMD area which is read from the multi-layer storage medium, all addresses on the multi-layer storage medium to which an additional write can be performed are acquired, and retained at a predetermined position in the buffer 513.

Figure 14:
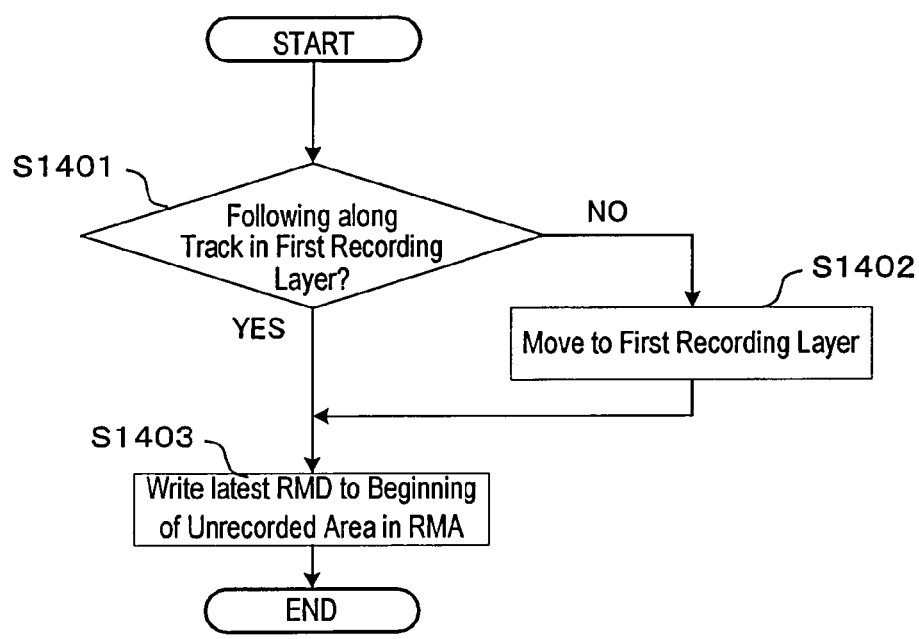
FIG. 14 is a flowchart showing a procedure of updating recording management data RMD, performed by an information recording/reproduction apparatus according to Embodiment 2 of the present invention.

Next, with reference to FIG. 14, a procedure of updating recording management data RMD which is performed by the information recording/reproduction apparatus 500 shown in FIG. 7 will be described.

First, at step S1401, the CPU 514 determines whether the focal point of laser light is following along a track in the first recording layer 1201 or not, and if it is following along a track in the first recording layer 1201, control proceeds to a process of step S1403, and otherwise proceeds to a process of step S1402.

At step S1402, the CPU 514 instructs the servo circuit 509 to control the focal point of laser light to follow along a track in the first recording layer 1201.

At step S1403, updated RMD is recorded in the beginning area of the unrecorded area in the RMA 310, i.e., the area immediately after the latest RMD.

Embodiment 3

Next, with reference to FIG. 15, a third embodiment of the present invention will be described. The multi-layer information storage medium of the present embodiment differs from the storage medium of the second embodiment in that spare areas are included in a recording layer which is most distant from the data-reading surface.

Figure 4:
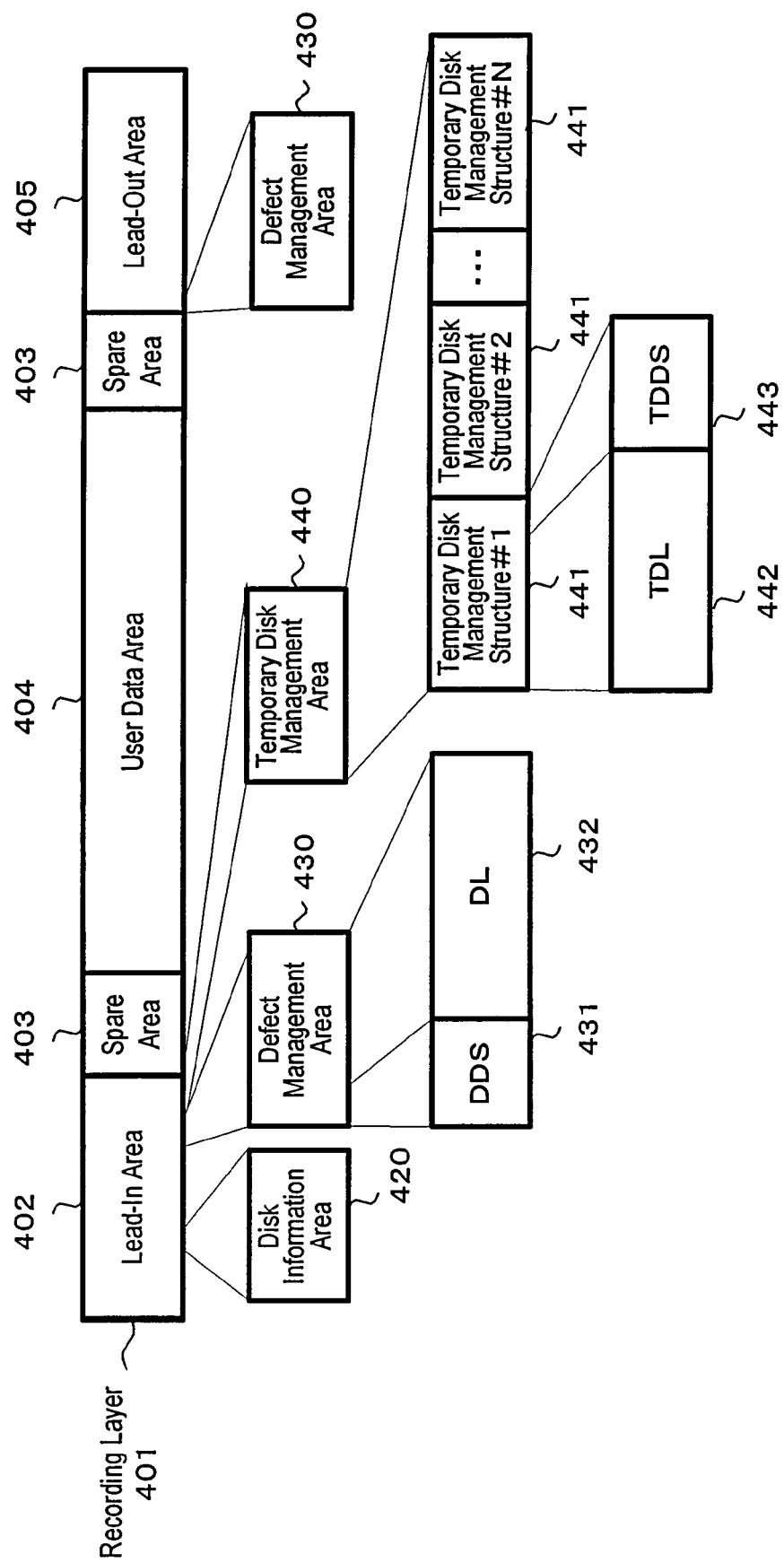
FIG. 4 is a diagram showing an area-layout of a recording layer of a conventional write-once optical disk which contains defect management information.
Figure 5:
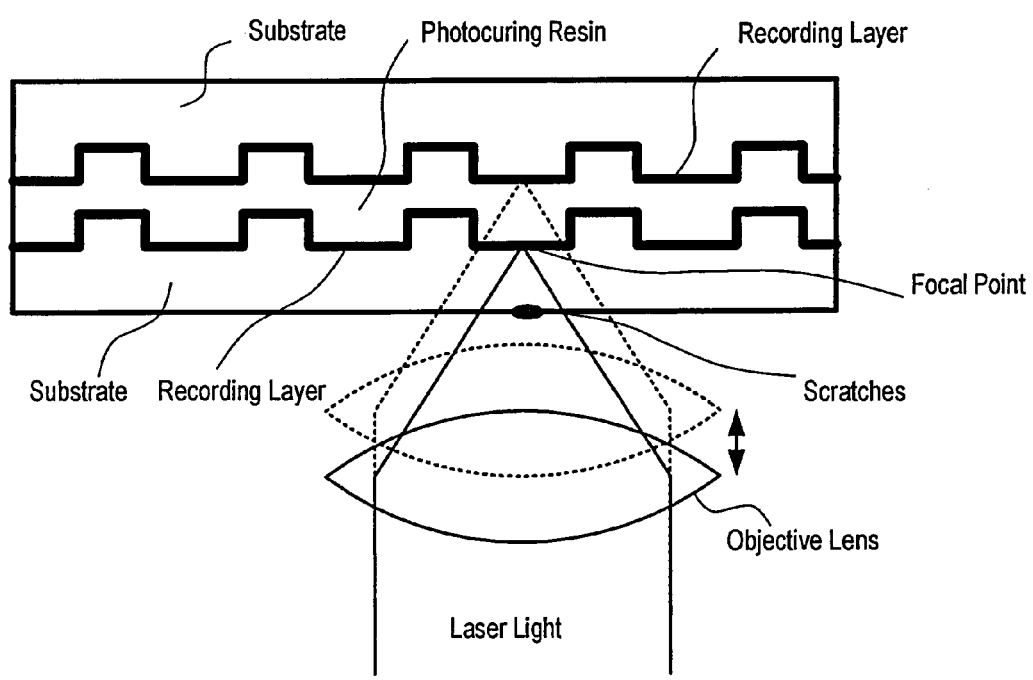
FIG. 5 is a diagram showing a two-layered optical disk having a scratch on the disk surface.
Figure 15:
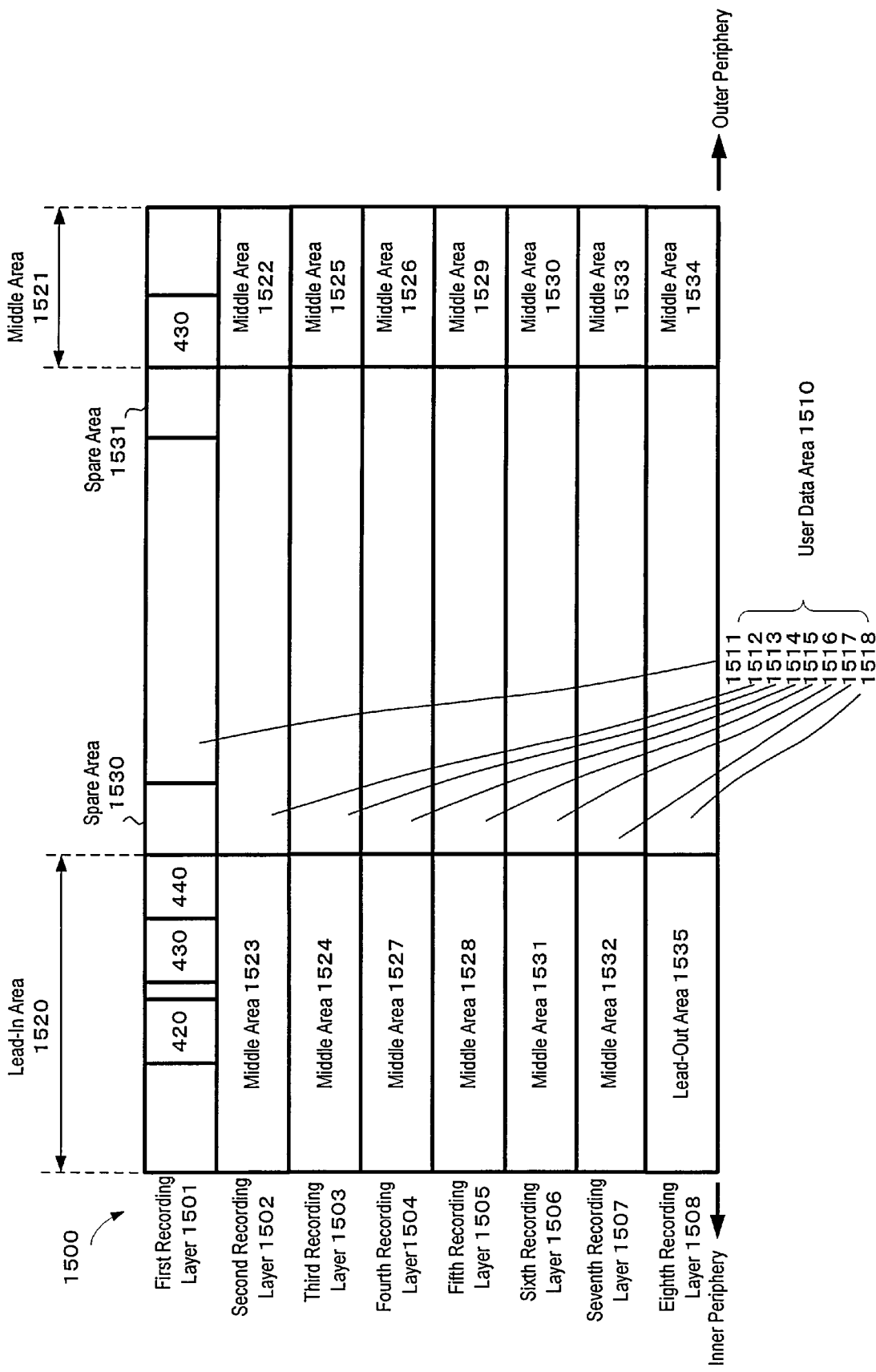
FIG. 15 is a diagram showing an area-layout of a multi-layer information storage medium according to Embodiment 3 of the present invention.

FIG. 15 shows an area-layout of a multi-layer information storage medium 1500 according to the present embodiment. The multi-layer information storage medium 1500 basically has a construction which is similar to the construction shown in FIG. 21, and includes eight recording layers 1501, 1502, . . . , and 1508. The multi-layer information storage medium 1500 is a write-once multi-layer information storage medium which includes a disk information area 420, a defect management area 430, and temporary disk management area 440 as shown in FIG. 4 in its first recording layer.

The multi-layer information storage medium 1500 has a user data area 1510 for recording user data, which is allocated among the respective recording layers. The first recording layer 1501 includes, from the inner periphery side toward the outer periphery side, a lead-in area 1520, a spare area 1530, a first user data area 1511 (which is a part of the user data area 1510), a spare area 1531, and a middle area 1521. The second recording layer 1502 includes, from the outer periphery side toward the inner periphery side, a middle area 1522, a second user data area 1512 (which is a part of the user data area 1510), and a middle area 1523. The third to sixth recording layers are similarly structured. The seventh recording layer 1507 includes, from the inner periphery side toward the outer periphery side, a middle area 1532, a seventh user data area 1517 (which is a part of the user data area 1510), and a middle area 1533. The eighth recording layer 1508 includes, from the outer periphery side toward the inner periphery side, a middle area 1534, an eighth user data area 1518 (which is a part of the user data area 1510), and a lead-out area 1535.

The lead-in area 1520 included in the first recording layer 1501 includes a disk information area 420 for recording management information concerning the eight recording layers 1501 to 1508, a defect management area 430, and a temporary disk management area 440. The middle area 1521 includes a defect management area 430. The defect management area 430 contains DDS 431 and DL 432 as shown in FIG. 4.

The temporary disk management area 440 is provided in the first recording layer 1501, and contains temporary defect management information concerning the defect management as to all of the recording layers 1501, 1502 and 1503. Since the temporary defect management information is provided in the first recording layer, which is the most distant from the data-reading surface, the reliability of the data in the defect management information can be improved, whereby a highly reliable multi-layer storage medium can be provided.

Although the storage medium according to the present embodiment is illustrated as comprising eight recording layers, the present invention is generally applicable to any information storage medium comprising three or more recording layers.

Although the disk information area 420, the defect management area 430, and the temporary disk management area 440 are provided only in the first recording layer 1501, they may be provided in any recording layer other than the first recording layer 1501. In the case where the multi-layer information storage medium 1500 includes (2×N−1) or (2×N) recording layers (where N is an integer equal to or greater than two), it is preferable that the disk information area 420, the defect management area 430, and the temporary disk management area 440 are provided only in the first to $N^{th}$ recording layers.

As for the spare areas 1530 and 1531, what has been described with respect to the first embodiment also applies to the present embodiment.

Figure 16:
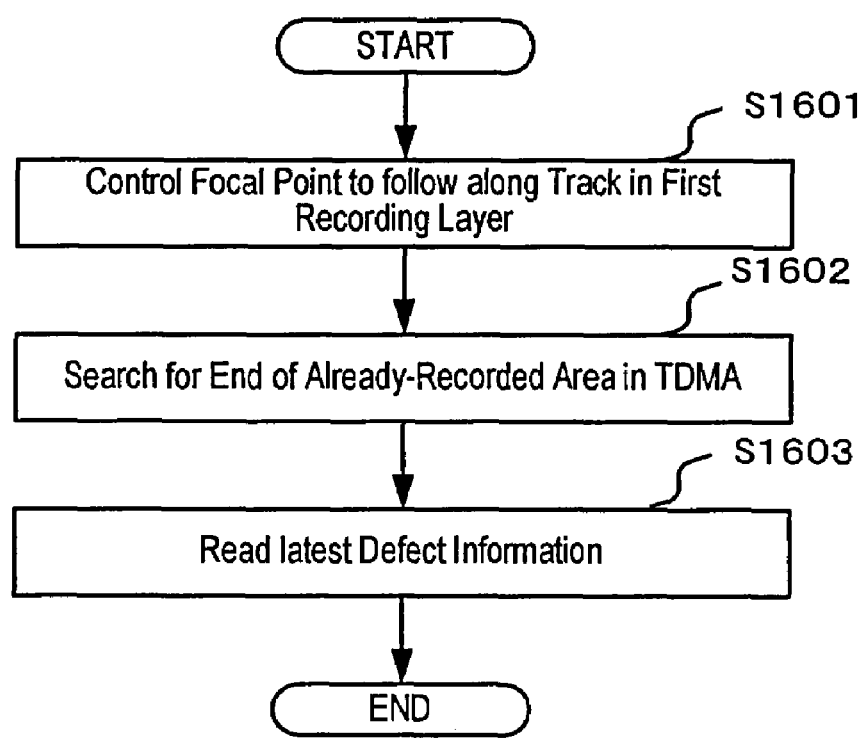
FIG. 16 is a flowchart showing a procedure of acquiring defect information from TDMA, performed by an information recording/reproduction apparatus according to Embodiment 3 of the present invention.

Next, with reference to FIG. 16, a procedure of acquiring defect information from the TDMA 440 of the multi-layer information storage medium 1500, performed by the information recording/reproduction apparatus 500 shown in FIG. 7, will be described.

First, at step S1601, the CPU 514 instructs the servo circuit 509 to control a focal point of laser light to follow along a track in the first recording layer 1501.

At step S1602, the end of the already-recorded area in the TDMA 440 is searched for. Based on a reproduction signal or the like from the multi-layer information storage medium 1500, the information recording/reproduction apparatus 500 sequentially distinguishes an already-recorded area from an unrecorded area, thus searching for a boundary between the already-recorded area and the unrecorded area.

At step S1603, the information recording/reproduction apparatus 500 determines that the final area of the already-recorded area is the latest TDMS 441 (FIG. 4), and executes a read process. Based on the content of the latest TDMS which is read from the multi-layer information storage medium 1500, defect information is acquired and retained at a predetermined position in the buffer 513.

Figure 17:
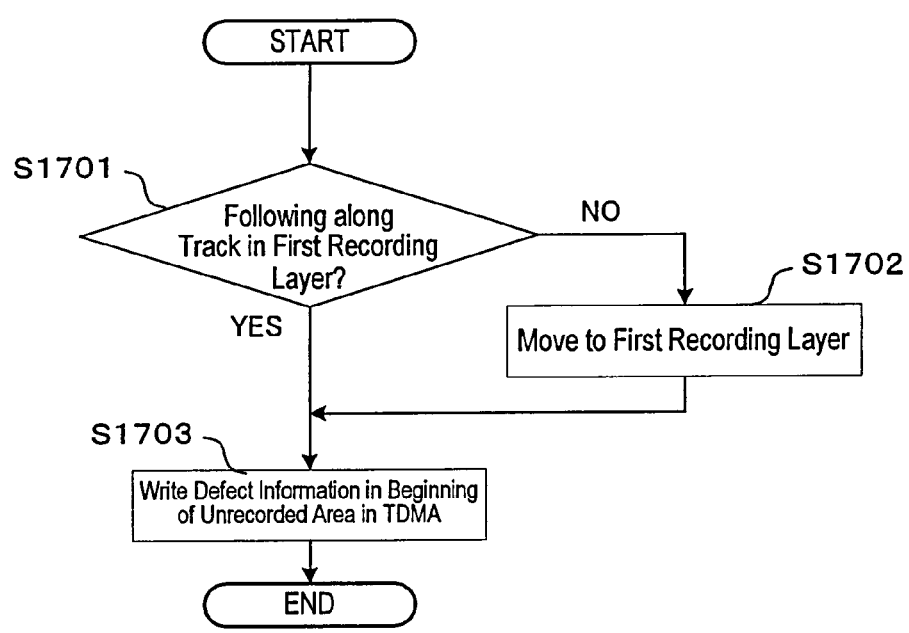
FIG. 17 is a flowchart showing a procedure of updating defect information in TDMA, performed by an information recording/reproduction apparatus according to Embodiment 3 of the present invention.

Referring to FIG. 17, a procedure of updating defect information in TDMA, performed by the information recording/reproduction apparatus 500, will be described.

First, at step S1701, the CPU 514 determines whether the focal point of laser light is following along a track in the first recording layer 1501 or not, and if it is following along a track in the first recording layer 1501, control proceeds to a process of step S1703, and otherwise proceeds to a process of step S1702.

At step S1702, the CPU 514 instructs the servo circuit 509 to control the focal point of laser light to follow along a track in the first recording layer.

At step S1703, updated defect information is recorded in the beginning area of the unrecorded area in the TDMA 440, i.e., the area immediately after the latest TDMS 441 (FIG. 4).

Embodiment 4

Hereinafter, with reference to FIG. 18, a fourth embodiment of the present invention will be described. The multi-layer information storage medium of the present embodiment differs from the storage medium of the third embodiment in that PC data is recorded in a recording layer which is relatively distant from the data-reading surface, as compared to AV data.

Figure 18:
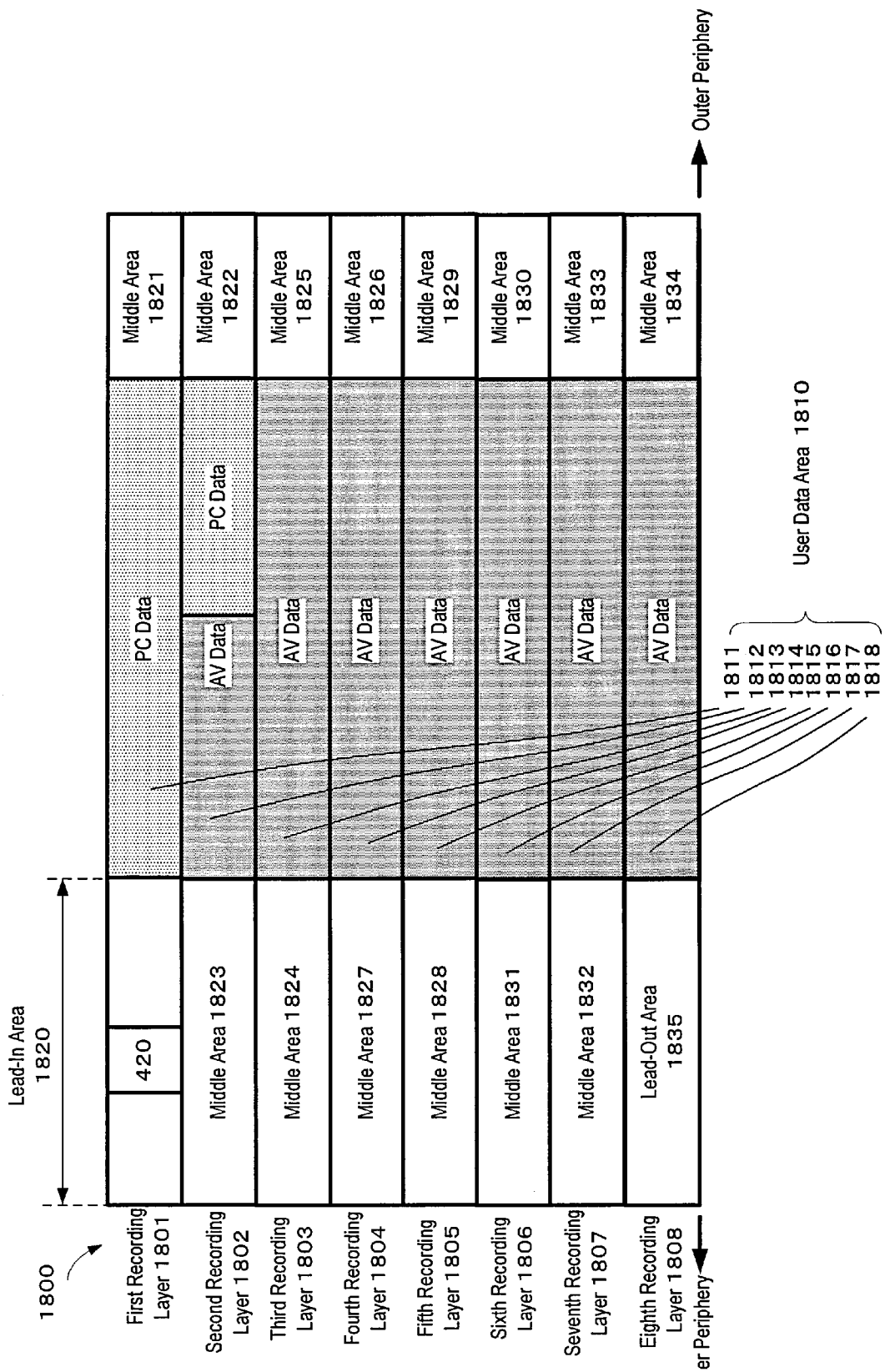
FIG. 18 is a diagram showing an area-layout of a multi-layer information storage medium according to Embodiment 4 of the present invention.

FIG. 18 shows an area-layout of a multi-layer information storage medium 1800 according to the present embodiment. The multi-layer information storage medium 1800 basically has a construction which is similar to the construction shown in FIG. 21, and includes eight recording layers 1801, 1802, . . . , and 1808.

The multi-layer information storage medium 1800 has a user data area 1810 for recording user data, which is allocated among the respective recording layers. The first recording layer 1801 includes, from the inner periphery side toward the outer periphery side, a lead-in area 1820, a first user data area 1811 (which is a part of the user data area 1810), and a middle area 1821. The second recording layer 1802 includes, from the outer periphery side toward the inner periphery side, a middle area 1822, a second user data area 1812 (which is a part of the user data area 1810), and a middle area 1823. The third to sixth recording layers are similarly structured. The seventh recording layer 1807 includes, from the inner periphery side toward the outer periphery side, a middle area 1832, a seventh user data area 1817 (which is a part of the user data area 1810), and a middle area 1833. The eighth recording layer 1808 includes, from the outer periphery side toward the inner periphery side, a middle area 1834, an eighth user data area 1818 (which is a part of the user data area 1810), and a lead-out area 1835.

The lead-in area 1820 provided in the first recording layer 1801 includes a disk information area 420 for recording management information concerning the eight recording layers 1801 to 1808. Data which requires a high reliability (PC data) is recorded in the user data area 1811 of the first recording layer 1801, as well as in a portion of the user data area 1812 of the second recording layer 1802. On the other hand, data which requires relatively low reliability (audio/video data: AV data) as compared to that required by PC data is recorded in the remainder of the user data area 1812 of the second recording layer 1802, as well as the user data areas of the other recording layers, up to the user data area 1818 of the eighth recording layer 1808. Note that "PC data" is data for computer recording, and examples thereof are data files, file management information, and program management information. Examples of "AV data" are video recording data and audio recording data.

In the present embodiment, PC data (which does not tolerate even small errors) is recorded in a recording layer whose distance from the data-reading surface is relatively long, and AV data (which does not require such a high reliability as is required by PC data) is recorded in a recording layer whose distance from the data-reading surface is relatively short. As a result, the reliability of the multi-layer information storage medium is enhanced.

Note that PC data may be recorded in any recording layer whose distance from the data-reading surface of the multi-layer information storage medium 1800 is not shorter than that of any recording layer in which AV data is recorded. Therefore, PC data may be recorded from the user data area 1811 of the first recording layer 1801 to the user data area 1817 of the seventh recording layer, in the case where AV data is recorded in the user data area 1818 of the eighth recording layer 1808.

Although the present embodiment illustrates an example where at least one of PC data and AV data is recorded in every recording layer, it will be understood that any unused user data area may be left unrecorded or contain dummy data recorded therein.

Figure 19:
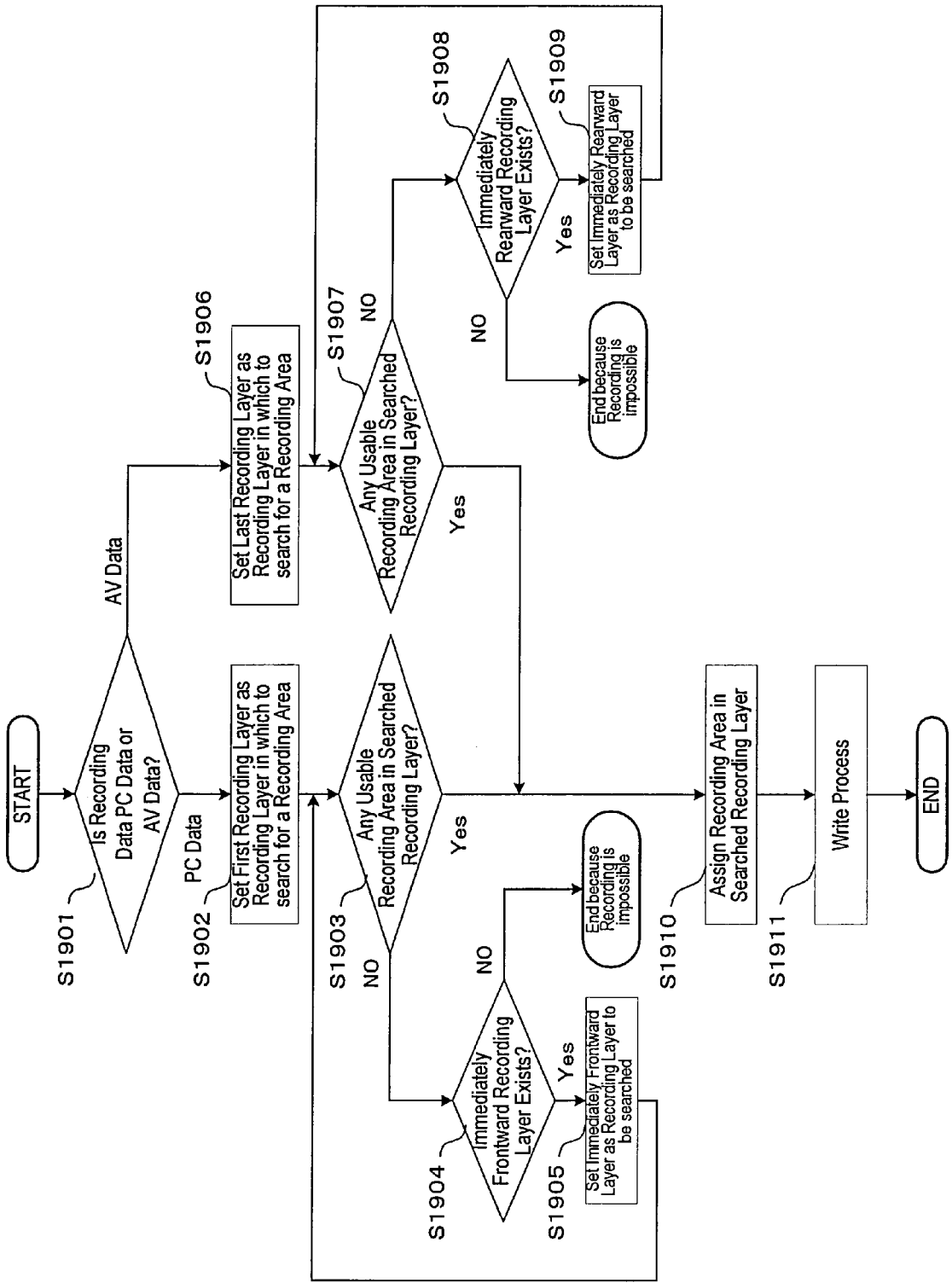
FIG. 19 is a flowchart showing a recording procedure performed by a host computer according to Embodiment 4 of the present invention.

Next, with reference to FIG. 19, the operations according to the present embodiment will be described. FIG. 19 is a flowchart illustrating a first recording procedure.

First, at step S1901, it is determined whether the data to be recorded (hereinafter referred to as "recording data") in the user data area 1810 of the multi-layer information storage medium 1800 is PC data or AV data. In the present embodiment, if the recording data is a data file, file management information, program management information, or the like, then the data is determined as "PC data". On the other hand, if the recording data is video recording data or audio recording data, the data is determined as "AV data". Such a determination can be made by the host computer 540 shown in FIG. 7.

If the recording data is PC data, control proceeds to a process of step S1902. If the recording data is AV data, control proceeds to a process of step S1906. At step S1902, the first recording layer 1801 is chosen as the recording layer in which to search for a recording area because its distance from the data-reading surface is relatively long. At step S1903, it is determined whether there is any usable recording area in the searched recording layer. If there is no usable recording area, control proceeds to a process of step S1904. If there is any usable recording area, control proceeds to a process of step S1910.

At step S1904, it is determined whether or not there exists any recording layer which lies immediately frontward of the searched recording layer. If there exists no immediately frontward recording layer, it is determined that recording is impossible, and the recording process is ended. If there exists such a recording layer, control proceeds to step S1905. At step S1905, this immediately frontward recording layer is set as the recording layer in which to search for a recording area, and control proceeds to a process of S1903.

At step S1906, the last recording layer (i.e., the eighth recording layer 1808) whose distance from the data-reading surface is shortest is selected as the recording layer in which to search for a recording area. At step S1907, it is determined whether there exists any usable recording area in the searched recording layer or not. If there is no usable recording area, control proceeds to a process of step S1908. If there is any usable recording area, control proceeds to a process of step S1910.

At step S1908, it is determined whether or not there exists any recording layer which lies immediately rearward of the searched recording layer. If there exists no immediately rearward recording layer, it is determined that recording is impossible, and the recording process is ended. If there exists such a recording layer, control proceeds to step S1909. At step S1909, this immediately rearward recording layer is set as the recording layer in which to search for a recording area, and control proceeds to a process of S1907.

A recording area is assigned at step S1910, and the information recording/reproduction apparatus 500 executes a recording process at step S1911. When causing the multi-layer information storage medium 1800 to perform data recording, the host computer 540 sends commands containing such instructions to the information recording/reproduction apparatus 500 in accordance with the interface protocol.

Figure 20:
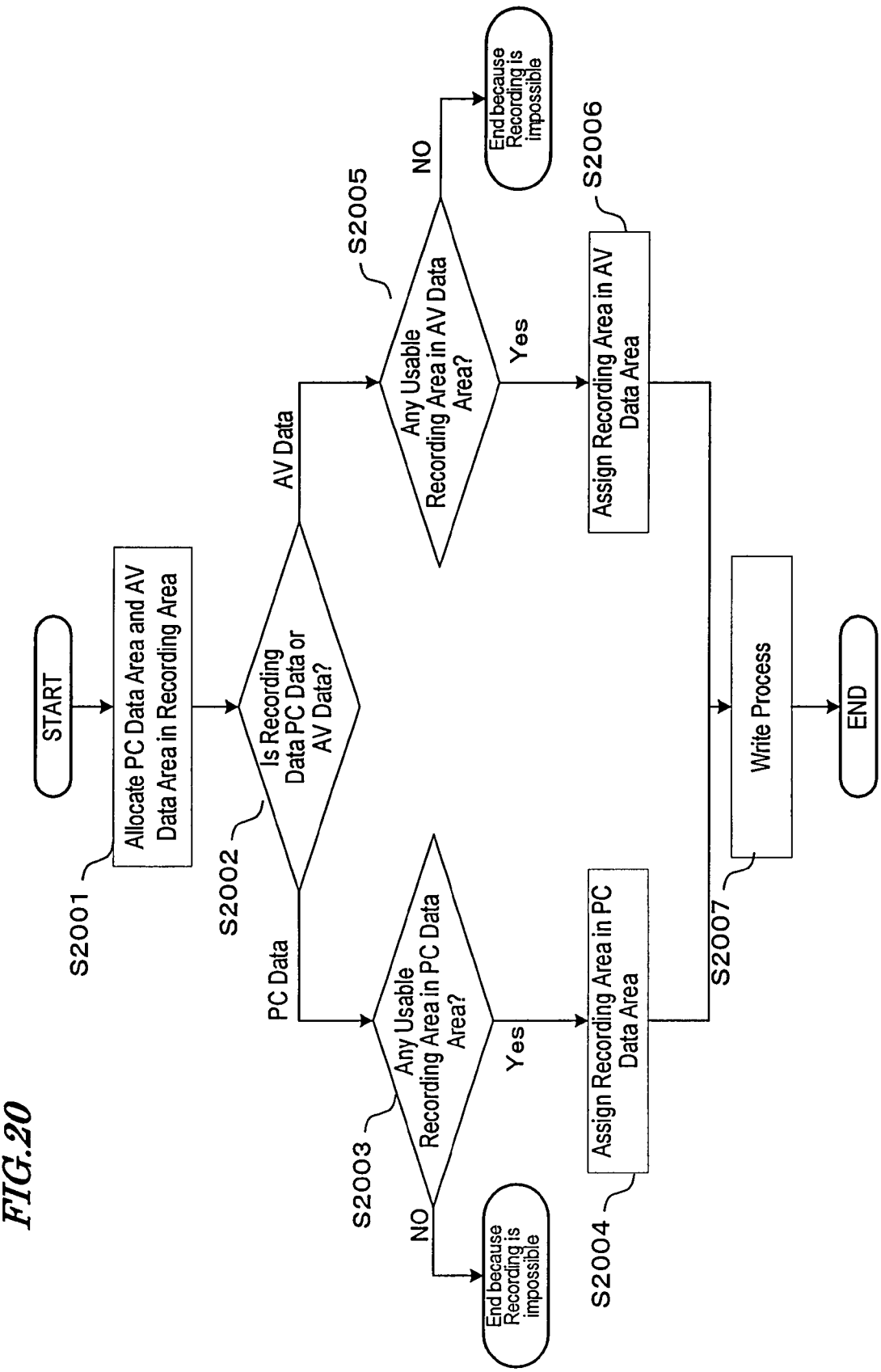
FIG. 20 is a flowchart showing another exemplary operation according to Embodiment 4 of the present invention.

Next, with reference to FIG. 20, a second recording procedure will be described.

First, at step S2001, a PC data area for recording PC data and an AV recording area for recording AV data are allocated. At this time, as the PC data area, a recording layer is allocated whose distance from the data-reading surface is not shorter than that of the AV data area. For example, the allocation of the PC data area and AV data area is performed by the host computer 540 calculating the PC data area and AV data area from the recorded size of PC data and the recorded size of AV data among all data to be recorded.

Next, at step S2002, it is determined whether the recording data is PC data or AV data, according to the aforementioned method. If the recording data is PC data, control proceeds to a process of step S2003. If the recording data is AV data, control proceeds to a process of step S2005.

At step S2003, it is determined whether there exists any usable recording area in the PC data area or not. If there exists any usable recording area, control proceeds to a process of step S2004. If there exists no usable recording area, it is determined that recording is impossible, and the recording process is ended.

At step S2004, a recording area is assigned in the PC data area, and control proceeds to step S2007. Within the PC data area, recording areas may be sequentially assigned, either from the inner periphery or the outer periphery side, in a recording layer whose distance from the data-reading surface is relatively long. Alternatively, within the PC data area, recording areas may be sequentially assigned, either from the inner periphery or the outer periphery side, in a recording layer whose distance from the data-reading surface is relatively short. Further alternatively, recording areas may be randomly assigned within the PC data area.

At step S2005, it is determined whether there exists any usable recording area in the AV data area or not. If there exists any usable recording area, control proceeds to a process of step S2006. If there exists no usable recording area, it is determined that recording is impossible, and the recording process is ended.

At step S2006, a recording area is assigned in the AV data area, and control proceeds to step S2007. Within the AV data area, recording areas may be sequentially assigned, either from the inner periphery or the outer periphery side, in a recording layer whose distance from the data-reading surface is relatively short. Alternatively, within the AV data area, recording areas may be sequentially assigned, either from the inner periphery or the outer periphery side, in a recording layer whose distance from the data-reading surface is relatively long. Further alternatively, recording areas may be randomly assigned within the AV data area.

At step S2007, the information recording/reproduction apparatus 500 executes a recording process. The host computer 540 sends commands containing such instructions to the information recording/reproduction apparatus 500 in accordance with the interface protocol.

At step S2003, instead of determining impossibility of recording and ending the recording process when there exists no usable recording area, a PC data area may be re-allocated, and a recording area may be assigned in the newly-allocated area. Furthermore, the AV data area may be reduced and a PC data area may be re-allocated, and a recording area may be assigned in the newly-allocated area.

Similarly at step S2005, instead of determining impossibility of recording and ending the recording process when there exists no usable recording area, an AV data area may be re-allocated, and a recording area may be assigned in the newly-allocated area. Furthermore, the PC data area may be reduced and an AV data area may be re-allocated, and a recording area may be assigned in the newly-allocated area.

When all recordings have been finished, for example, dummy data may be recorded in any unused portions of the PC data area and the AV data area.

As described above, according to the present embodiment, in a multi-layer information storage medium, PC data is recorded in the user data area of a recording layer whose distance from the data-reading surface is relatively long, and AV data is recorded in the user data area of a recording layer whose distance from the data-reading surface is relatively short. As a result, a highly reliable multi-layer storage medium can be provided.

The number of recording layers is not limited to eight, and may be three or more. Any other recording process procedure may be employed so long as it meets the objective of recording PC data in the user data area of a recording layer whose distance from the data-reading surface is relatively long, and recording AV data in the user data area of a recording layer whose distance from the data-reading surface is relatively short.

Note that, Embodiments 1 to 4 can be practiced in any arbitrary combination.

The multi-layer information storage medium and information apparatus according to the present invention can be applied in optical disk recorders, optical disk drives for PCs, and the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A multi-layer information storage medium comprising:
   a data-reading surface; and
   three or more recording layers for recording data which is read out by using a light beam of a same wavelength, wherein,
   each recording layer has a user data area; and
   among the three or more recording layers, a recording layer whose user data area has audio/video data recorded therein is provided at a position which is not more distant from the data-reading surface than any recording layer whose user data area has data other than audio/video data recorded therein.

2. The multi-layer information storage medium of claim 1, wherein the data other than audio/video data is computer data.

3. An information apparatus for executing at least one of: reproducing information from a multi-layer information storage medium having three or more recording layers; and recording information onto the multi-layer information storage medium, the information apparatus comprising:
   a motor for rotating the multi-layer information storage medium;
   an optical pickup for converging a light beam onto an arbitrary recording layer in the multi-layer information storage medium, and detecting reflected light from the recording layer;
   a signal processing section for reproducing information which is recorded on the multi-layer information storage medium based on an output from the optical pickup;
   means for determining whether data to be written to a user data area of the multi-layer information storage medium is audio/video data or not; and
   means for, among any usable user data areas in the multi-layer information storage medium, assigning a recording area by beginning from a user data area of a recording layer which is the most distant from a data-reading surface of the multi-layer information storage medium when it is determined that the data to be written is not audio/video data; and assigning a recording area by beginning from a user data area of a recording layer which is the closest to the data-reading surface of the multi-layer information storage medium when the data to be written is audio/video data.

4. The multi-layer information storage medium of claim 2, wherein the computer data includes data files.

5. The multi-layer information storage medium of claim 1, wherein a recording layer at a shorter distance from the data-reading surface has a lower reliability for data reproduction when defects exist on the data-reading surface of the multi-layer information storage medium.

6. The multi-layer information storage medium of claim 1, wherein the defects include scratches, fingerprints, dust, and/or soil.

7. The information apparatus of claim 3, wherein the data other than audio/video data is computer data.

8. The information apparatus of claim 7, wherein the computer data includes data files.

9. The information apparatus of claim 3, wherein a recording layer at a shorter distance from the data-reading surface has a lower reliability for data reproduction when defects exist on the data-reading surface of the multi-layer information storage medium.

10. The information apparatus of claim 9, wherein the defects include scratches, fingerprints, dust, and/or soil.

* * * * *